(12) United States Patent
Kliewer

(10) Patent No.: US 8,740,743 B2
(45) Date of Patent: Jun. 3, 2014

(54) CONTINUOUSLY VARIABLE TRANSMISSION DEVICE AND METHOD

(75) Inventor: Joe Kliewer, Houston, TX (US)

(73) Assignee: Orbital Traction Limited, Houston, TX (US)

( * ) Notice: Subject to any disclaimer, the term of this patent is extended or adjusted under 35 U.S.C. 154(b) by 0 days.

(21) Appl. No.: 13/640,990

(22) PCT Filed: Apr. 14, 2011

(86) PCT No.: PCT/US2011/000686
§ 371 (c)(1),
(2), (4) Date: Dec. 20, 2012

(87) PCT Pub. No.: WO2011/129898
PCT Pub. Date: Oct. 20, 2011

(65) Prior Publication Data
US 2013/0288845 A1    Oct. 31, 2013

(30) Foreign Application Priority Data

Apr. 15, 2010 (GB) .................................. 1006292.5

(51) Int. Cl.
*F16H 13/08* (2006.01)
(52) U.S. Cl.
USPC .......................................................... 475/196
(58) Field of Classification Search
CPC ........ F16H 13/08; F16H 13/10; F16H 15/503
USPC ........................................................ 475/196
See application file for complete search history.

(56) References Cited

U.S. PATENT DOCUMENTS

| 4,463,620 | A | 8/1984 | Horton |
| 4,928,543 | A * | 5/1990 | Johannesen et al. .......... 475/196 |
| 5,651,750 | A | 7/1997 | Imanishi et al. |
| 5,662,546 | A | 9/1997 | Takata et al. |
| 6,406,399 | B1 | 6/2002 | Ai |
| 7,431,677 | B2 * | 10/2008 | Miller et al. .................. 475/196 |
| 8,313,405 | B2 * | 11/2012 | Bazyn et al. .................. 475/196 |
| 2004/0092359 | A1 | 5/2004 | Imanishi |
| 2007/0270267 | A1 | 11/2007 | Miller |
| 2008/0200300 | A1 | 8/2008 | Smithson et al. |

FOREIGN PATENT DOCUMENTS

| GB | 2354293 | 3/2001 |
| GB | 2408081 | 5/2005 |
| WO | WO02088573 | 11/2002 |

OTHER PUBLICATIONS

Yang, Kyung Jinn "International Search Report and Written Opinion" Korean Intellectual Property Office; Dec. 7, 2011.
McKinney, Mike "Combined Search and Examination Report under Sections 17 and 18(3)" United Kingdom Intellectual Property Office; Apr. 16, 2012.

* cited by examiner

*Primary Examiner* — Edwin A Young
(74) *Attorney, Agent, or Firm* — Bradley Arant Boult Cummings LLP

(57) ABSTRACT

A variable transmission device and method are disclosed. The variable transmission device comprises: radially inner and outer races, each comprising two parts spaced along an axis; planetary members arranged in rolling contact with said inner and outer races; a transmission ratio controller operable to vary a separation along said axis of said two parts of one of said inner and outer races resulting in a radial displacement of said planetary members to vary a transmission ratio; and a clamping force controller coupled to at least one of said two parts of another of said inner and outer races and to an input shaft, said clamping force controller comprising opposing surfaces operable rotate relative to each other in response to a torque applied to said input shaft, at least one of said opposing surfaces being defined by a ramp having a non-linear lead profile, said relative rotation of said opposing surfaces causing a non-linear change in separation along said axis of said two parts of said another of said inner and outer races to accommodate said radial displacement of said planetary members and to control clamping forces applied between said planetary members and said inner and outer races proportionately to said torque applied to said input shaft and said different transmission ratios. Providing a non-linear ramp enables the clamping force generated between the races and the planets to be varied dependent on the transmission ratio of the device. Accordingly, rather than simply generating a clamping force which is proportionate to the torque applied to the input shaft, the clamping force generated is proportionate to both the input torque and the transmission ratio of the device. In this way, only the required amount of clamping force is generated, which is suited to the particular transmission ratio of the device. This helps to ensure that the loading on the components is reduced, the amount of friction and heat generated within the device is minimized which reduces wear and the efficiency of the device is increased.

20 Claims, 23 Drawing Sheets

CONTINUOUSLY VARIABLE TRANSMISSION DEVICE AND METHOD

CROSS-REFERENCE TO RELATED APPLICATIONS

This application is a national stage under 35 U.S.C. 371 of International Application PCT/US2011/000686, filed on Apr. 14, 2011 (currently pending). International Application PCT/US2011/000686 cites the priority of British Patent Application 1006292.5, filed Apr. 15, 2010 (currently pending).

PRIORITY CLAIM

This PCT application claims priority to Great Britain Patent Application Number 1006292.5 filed on Apr. 15, 2010.

FIELD OF THE INVENTION

The present invention relates to a variable transmission device and method.

BACKGROUND

Variable transmission devices are known. In one example type of such variable transmission devices, planetary members are provided in rolling contact with inner and outer races. The inner and outer races have two parts, the axial separation of which is adjustable. The transmission ratio of input to output speed of the device is adjusted by varying the axial separation of the outer race parts which causes a corresponding radial shift of the planetary members. The axial separation of the inner race parts adjusts to compensate for the radial change in position of the planetary members, as will be discussed in more detail below. The changing position of the contact points between the planetary members and the inner and outer races causes the change in transmission ratio of the device. Typically, the inner race is coupled with an input shaft and the planetary members are coupled via a planet follower arrangement to an output shaft. To enable the axial separation of the inner race parts to adjust, a helical screw coupling is provided on the input shaft so that rotation of the input shaft in the intended direction causes the two parts of the inner race to approach each other until the force exerted on the helical interengagement between the inner race and the input shaft matches the reaction forces between the inner race and the planetary members. When these forces match, no further relative axial displacement of the inner race parts takes place and a drive torque is transmitted at the transmission ratio determined by the radial position of the planetary members when this occurs.

Although this arrangement enables drive torque to be transmitted between the input and output shaft at the appropriate transmission ratio, undesirable consequences can occur.

Accordingly, it is desired to provide an improved variable transmission device.

SUMMARY

According to a first aspect, there is provided a variable transmission device comprising: radially inner and outer races, each comprising two parts spaced along an axis; planetary members arranged in rolling contact with said inner and outer races; a transmission ratio controller operable to vary a separation along said axis of said two parts of one of said inner and outer races resulting in a radial displacement of said planetary members to vary a transmission ratio; and a clamping force controller coupled to at least one of said two parts of another of said inner and outer races and to an input shaft, said clamping force controller comprising opposing surfaces operable rotate relative to each other in response to a torque applied to said input shaft, at least one of said opposing surfaces being defined by, a ramp having a non-linear lead profile, said relative rotation of said opposing surfaces causing a non-linear change in separation along said axis of said two parts of said another of said inner and outer races to accommodate said radial displacement of said planetary members and to control clamping forces applied between said planetary members and said inner and outer races proportionately to said torque applied to said input shaft and said different transmission ratios.

The first aspect recognises that a problem with the existing helical screw coupling arrangement is that the clamping load provided by this coupling is solely a function of input torque. As a result, the clamp load that is produced will need to be designed typically to be more than is needed across the range of transmission ratios in order that sufficient clamp load is produced under the most extreme conditions. Producing too much clamping force results in excessive loading of the components which requires higher quality components, unnecessarily reduces the life of these components and causes a reduction in the efficiency of the device.

Accordingly, a clamping force controller is provided having opposing surfaces which rotate relative to each other in response to the input torque. One or more of those opposing surfaces are defined by a ramp which has a non-linear lead profile. Providing a non-linear ramp enables the clamping force generated between the races and the planets to be varied dependent on the transmission ratio of the device. Hence, unlike in the helical coupling arrangement which would generate the same clamping force irrespective of the transmission ratio of the device (and so must assume a worst case arrangement and apply the maximum clamping force which would be required across all ratios), the non-linear ramp enables the clamping force to vary proportionately to the different transmission ratios. Accordingly, rather than simply generating a clamping force which is proportionate to the torque applied to the input shaft, the clamping force generated is proportionate to both the input torque and the transmission ratio of the device. In this way, only the required amount of clamping force is generated, which is suited to the particular transmission ratio of the device. This helps to ensure that the loading on the components is reduced, the amount of friction and heat generated within the device is minimised which reduces wear and the efficiency of the device is increased.

In one embodiment, said non-linear lead profile of said ramp provides, for each transmission ratio, a different predetermined clamping force for a predetermined torque applied to said input shaft. Accordingly, it can be sent that for the same torque applied to the input shaft, the non-linear lead profile of the ramp provides a different clamping force at each different transmission ratio.

In one embodiment, said non-linear lead profile of said ramp provides a clamping force which is higher for said predetermined torque applied to said input shaft when a tangent to a contact patch between said planetary members and said inner race tends towards being normal to said axis than a clamping force for said predetermined torque applied to said input shaft when said tangent to said contact patch between said planetary members and said inner race tends towards being parallel with said axis. Accordingly, when the planetary members contact the inner race parts towards their radially outermost location (such as would occur when the inner race parts are located closest together and the tangent of the contact patch between the inner race parts and the planetary member approaches an orientation which is normal to the axis, i.e. approaches an orientation which is radial) the non-linear lead profile of the ramp provides the high clamping force which is required when the planetary members are in this position. However, when the planetary members are in a position where they contact the inner race at its radially innermost position (such as would occur when the inner race parts are at their greatest axial separation) then the profile of the ramp provides a lower clamping force, as is required when the planetary member is in this position.

In one embodiment, said non-linear lead profile of said ramp has a slope which is shallower when said tangent to said contact patch between said planetary members and said inner race tends towards being normal to said axis than when said tangent to said contact patch between said planetary members and said inner race tends towards being parallel with said axis. It will be appreciated that a shallower slope generates a higher clamping force than a steeper slope. Accordingly, the slope of the ramp is arranged to be shallower when the planetary members are radially outer most on the inner races (and so require a greater clamping force) and steeper when the planetary members are radially inner most on the inner races (and so require a reduced clamping force).

In one embodiment, said non-linear lead profile is mirrored to enable said clamping forces to be generated in response to said torque applied to said input shaft when both rotated and counter-rotated. By providing a symmetric ramp by mirroring or reflecting the non-linear lead profile of the ramp, the same clamping force profile characteristics can be generated irrespective of whether the device is being rotated in one direction or the other (i.e. in forward or reverse). It will be appreciated that this arrangement provides a particularly simple, compact and elegant solution for bi-directional drives without needing additional complex parts and avoids many of the problems associated with helical screw arrangements, for example backlash and the like.

In one embodiment, both of said opposing surfaces are defined by ramps having a non-linear lead profile. Providing both opposing surfaces with ramp profiles, the effective range of slopes that may be generated is increased whilst still enabling the provision of a compact device.

In one embodiment, said non-linear lead profile is defined in accordance with the following algorithm:

$$\text{Lead} = \frac{\mu * R_{contact} * \pi}{\text{Sin}(\theta)}$$

where $\mu$ is the coefficient of friction between the races and planets, R is the contact radius and $\theta$ is the contact angle. Accordingly, it can be seen that the profile of the non-linear lead may be generated to suit the geometry of any particular implementation.

In one embodiment, said clamping force controller comprises a pair of annular rings coaxially aligned to provide said opposing surfaces, a first of said pair of annular rings being coupled to said input shaft and a second of said pair of annular rings being coupled to at least one of said two axially spaced parts of said another of said inner and outer races. Annular rings provide a particular compact, robust, simple and easily manufacturable arrangement which also enables the forces generated to be more readily spread to reduce stresses.

In one embodiment, said clamping force controller comprises two pairs of annular rings, each pair being coaxially aligned to provide respective opposing surfaces, a first of each pair of annular rings being coupled to said input shaft and a second of each pair of annular rings being coupled to a respective one of said two axially spaced parts of said another of said inner and outer races.

In one embodiment, said non-linear lead profile is repeated a predetermined number of times around each annular ring. By repeating the profile around each ring, the number of contact points between the rings is increased, thereby reducing point loads. Also, by repeating the lead profile the degree of counter rotation of the annular rings can be minimised.

In one embodiment, the variable transmission device comprises a friction-reducing device disposed between said opposing surfaces and operable to reduce friction caused by relative rotation of said opposing surfaces. By providing a friction reducing device between the surfaces, the amount of friction is reduced which enables the counter rotation to occur much more readily, thereby reducing the amount of heat generated and assisting in ensuring that the correct position on the ramp is achieved to generate the required clamping force.

In one embodiment, said friction reducing device comprises a plurality of rollers.

In one embodiment, the variable transmission device comprises a pre-clamping device operable to apply a pre-clamping force between said planetary members and said inner and outer races. Applying a pre-clamping force to the planetary members helps to ensure that the races maintain contact with the planetary members even when no torque is applied. Also, the pre-clamping device biases the race parts against the planetary members and this bias may readily be overcome when changing the transmission ratio, even when the device is stationary.

In one embodiment, said pre-clamping device comprises a spring arrangement operable to bias said two axially spaced parts of another of said inner and outer races towards each other. It will be appreciated that various different spring arrangements may be provided, but an annular wave spring may be particularly compact and convenient.

According to a second aspect of the present invention, there is provided a method of defining a profile of a ramp of a clamping force controller of a variable transmission device comprising: radially inner and outer races, each comprising two parts spaced along an axis; planetary members arranged in rolling contact with said inner and outer races; a transmission ratio controller operable to vary a separation along said axis of said two parts of one of said inner and outer races resulting in a radial displacement of said planetary members to vary a transmission ratio; and said clamping force controller coupled to at least one of said two parts of another of said inner and outer races and to an input shaft, said clamping force controller comprising opposing surfaces operable rotate relative to each other in response to a torque applied to said input shaft, at least one of said opposing surfaces being defined by a ramp, said relative rotation of said opposing surfaces causing a non-linear change in separation along said axis of said two parts of said another of said inner and outer races to accommodate said radial displacement of said planetary members and to control clamping forces applied between said planetary members and said inner and outer races proportionately to said torque applied to said input shaft and said different transmission ratios, said method comprising the steps of: defining said ramp to have a non-linear lead profile.

In one embodiment, said step of defining comprises: defining said ramp to have said non-linear lead profile to provide, for each transmission ratio, a different predetermined clamping force for a predetermined torque applied to said input shaft.

In one embodiment, said step of defining comprises: defining said ramp to have said non-linear lead profile to provide a clamping force which is higher for said predetermined torque applied to said input shaft when a tangent to a contact patch between said planetary members and said inner race tends towards being normal to said axis than a clamping force for said predetermined torque applied to said input shaft when said tangent to said contact patch between said planetary members and said inner race tends towards being parallel with said axis.

In one embodiment, said step of defining comprises: defining said ramp to have said non-linear lead profile to provide a slope which is shallower when said tangent to said contact patch between said planetary members and said inner race tends towards being normal to said axis than when said tangent to said contact patch between said planetary members and said inner race tends towards being parallel with said axis.

In one embodiment, the method comprises the step of: mirroring said non-linear lead profile to enable said clamping forces to be generated in response to said torque applied to said input shaft when both rotated and counter-rotated.

In one embodiment, the method comprises the step of: defining ramps of both of said opposing surfaces to have a non-linear lead profile.

In one embodiment, said step of defining comprises: defining said non-linear lead profile in accordance with the following algorithm:

$$\text{Lead} = \frac{\mu * R_{contact} * \pi}{\text{Sin}(\theta)}$$

where μ is the coefficient of friction between the races and planets, R is the contact radius and θ is the contact angle.

In one embodiment, said clamping force controller comprises at least a pair of annular rings coaxially aligned to provide said opposing surfaces, a first of said pair of annular rings being coupled to said input shaft and a second of said pair of annular rings being coupled to at least one of said two axially spaced parts of said another of said inner and outer races, and said method comprises the step of: repeating said non-linear lead profile a predetermined number of times around each annular ring.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings.

DESCRIPTION OF THE EMBODIMENTS

Figure 1:
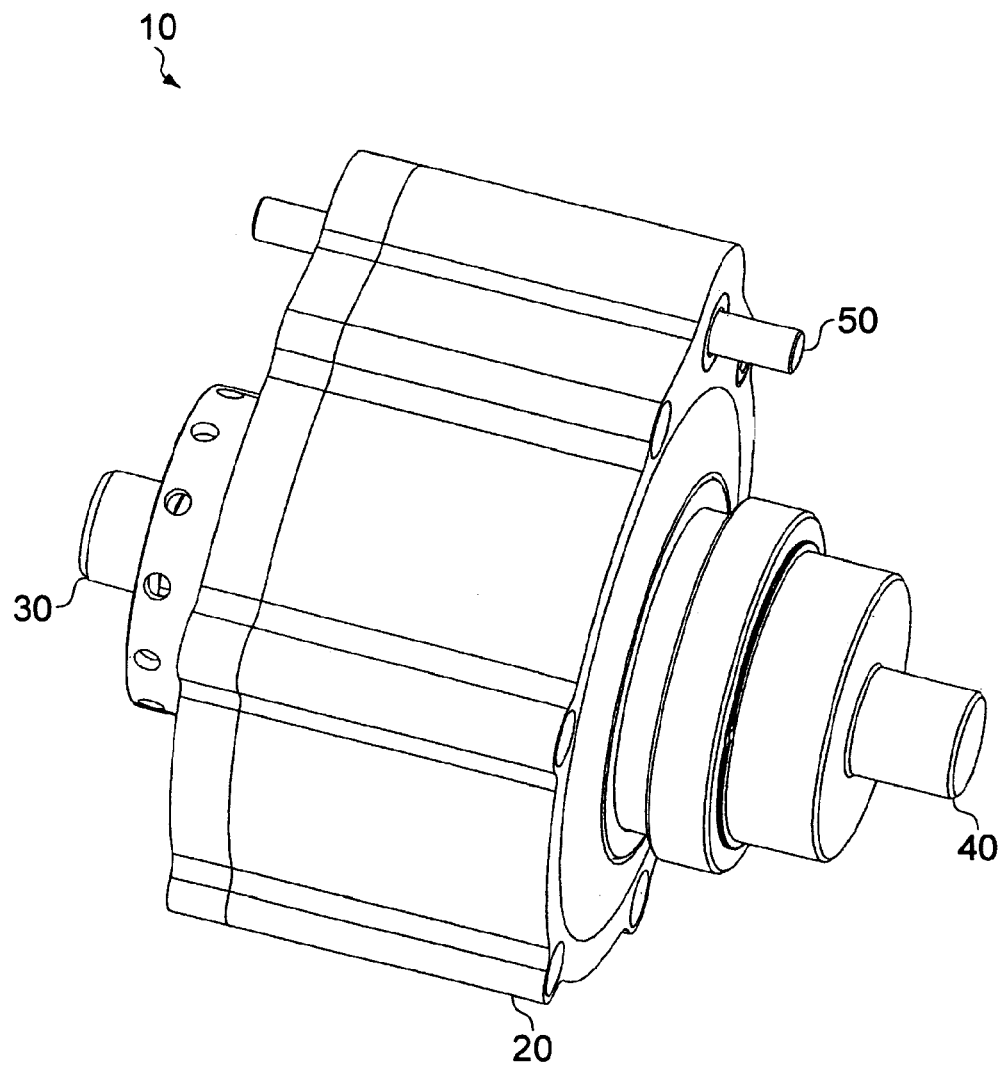
FIG. 1 illustrates a variable transmission device according to one embodiment.

FIG. 1 illustrates a variable transmission device, generally 10, according to one embodiment. The continuously variable transmission device 10 comprises a housing 20 from which protrudes an input shaft 30 and an output shaft 40. The input shaft 30 is operable to receive an input torque, which is transmitted as an output torque to the output shaft 40. Although the rest of the description will assume the designation of the input and output shafts as indicated above, it will be appreciated that the designation of these shafts as input and output is arbitrary and that these designations may be reversed with input torque being applied to the output shaft 40 and output torque being generated at the input shaft 30. Also protruding from the housing 20 is a shift gear shaft 50 which may be rotated to change the transmission ratio between the input shaft 30 and the output shaft 40. For example, a transmission ratio of 1:3 would indicate that the output shaft 40 would rotate three times for a single turn of the input shaft 30.

Figure 2:
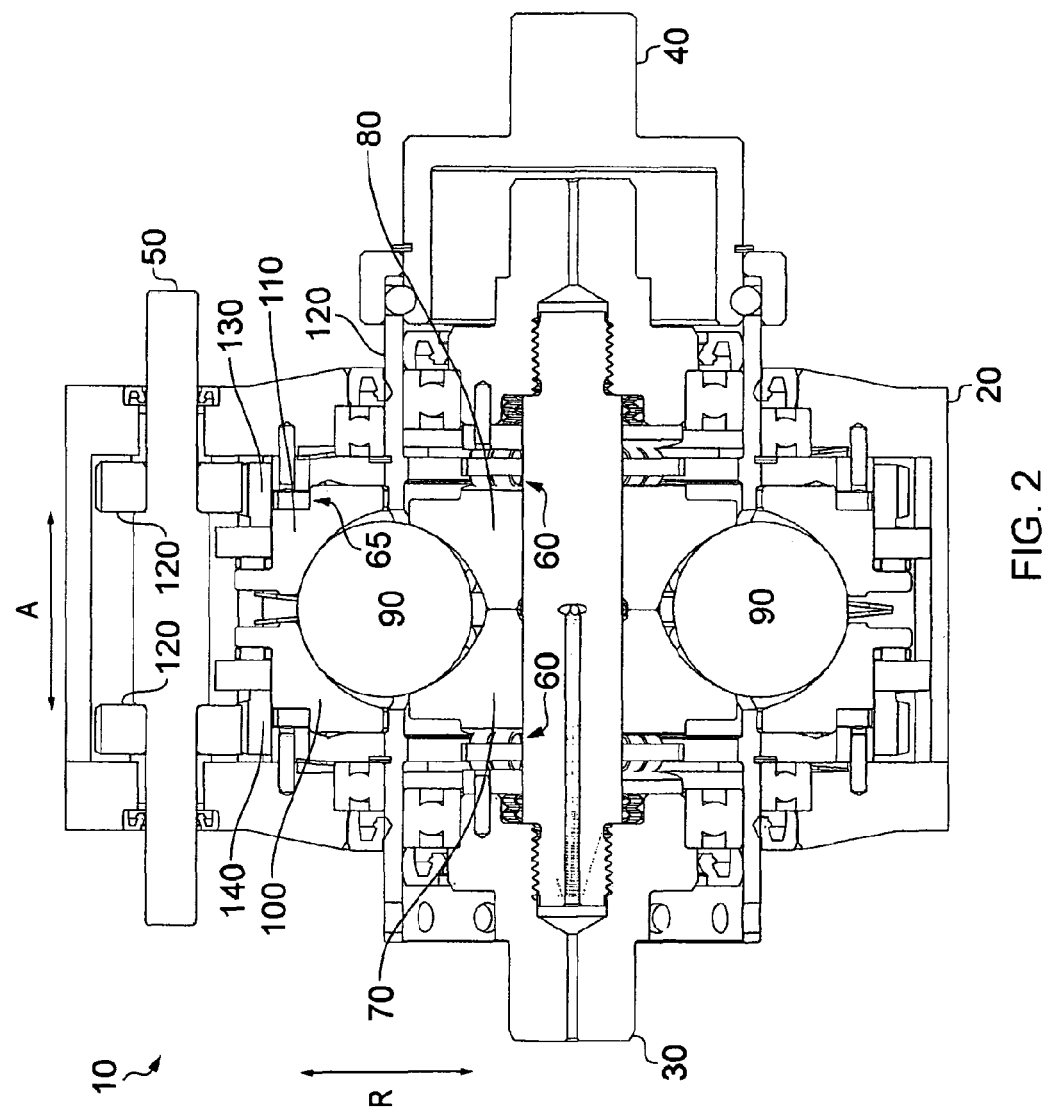
FIG. 2 is a cross-section through the variable transmission device shown in FIG. 1.

FIG. 2 is a cross-section through the variable transmission device 10 shown in FIG. 1. In overview, the input shaft 30 is coupled via a clamping force control mechanism, generally 60 with a pair of inner race parts 70, 80. A similar transmission ratio clamping force control mechanism, generally 65, is provided between the shift gear shaft 50 and the pair of outer race parts 100, 110. As will be explained in more detail below, the clamping force control mechanism 60 controls the amount of clamping force exerted by the inner race parts 70, 80 on the planets 90. Likewise, the transmission ratio clamping force control mechanism 65 controls the amount of clamping force exerted by the outer race parts 100, 110 on the planets 90. This provides for a balance between the forces applied to the inner races, the outer races and the planets. In this arrangement, five spherical planets 90 are provided which are in rolling contact with the inner race parts 70, 80 (although more or less than this number of planets may be provided and the planets may be other then perfect spheres). Also in rolling contact with the planets 90 are two outer race parts 100, 110. Each of the inner race parts 70, 80 and the outer race parts 100, 110 comprise, in cross-section, a part-circular arcuate surface the radius of which is slightly greater than the radius of the spherical planets 90. The planets are received within a planet carrier 120 which is coupled with the output shaft 40.

Rotation of the input shaft 30 is transmitted to the clamping force control mechanism 60 which causes the two parts of the inner race 70, 80 to approach each other and apply a force between the two parts of the inner race 70, 80 and the planets 90. When sufficient clamping force is generated, the two parts of the inner race 70, 80 rotates which causes rotation of the planets 90 by rolling contact therewith, the planets 90 rolling over the stationary parts of the outer race 100, 110. Rotation of the planets 90 is transmitted to the planet carrier 120 and thus to the output shaft 40.

Figure 3:
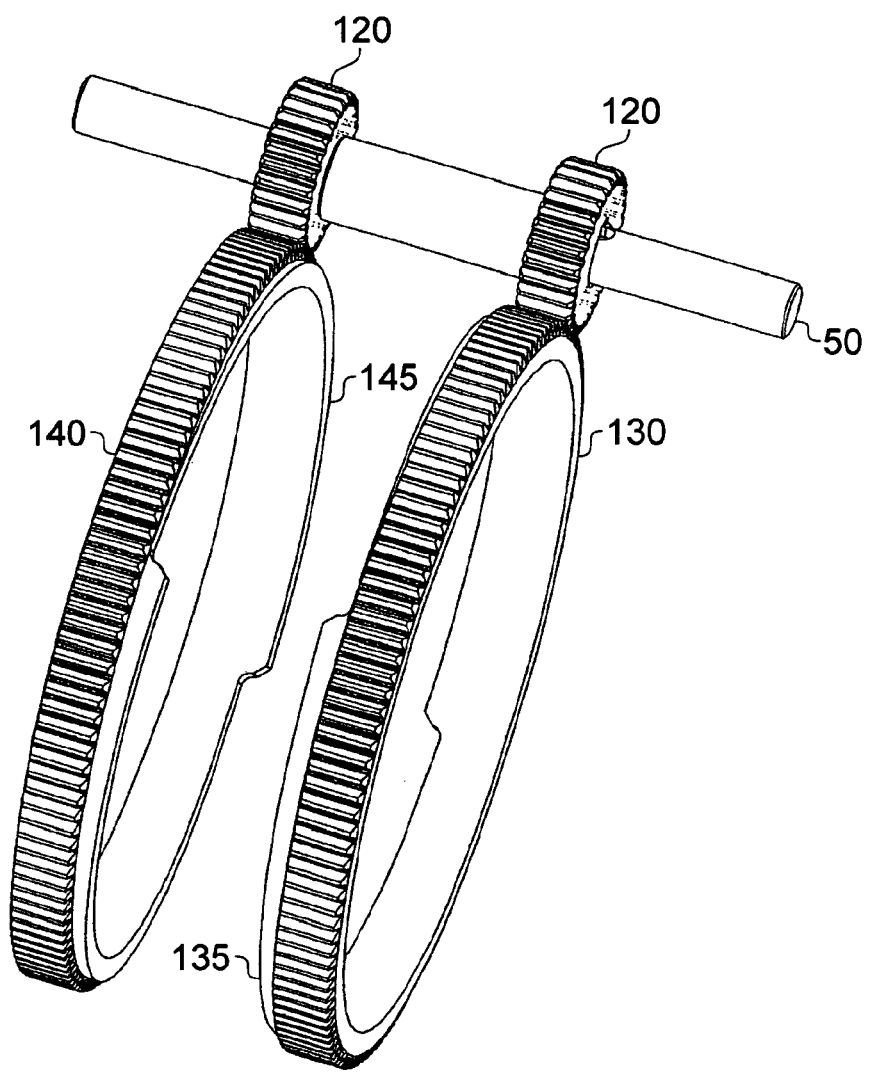
FIG. 3 illustrates in more detail the arrangement of the shift gear shaft mechanism of the variable transmission device shown in FIG. 1.
Figure 20:
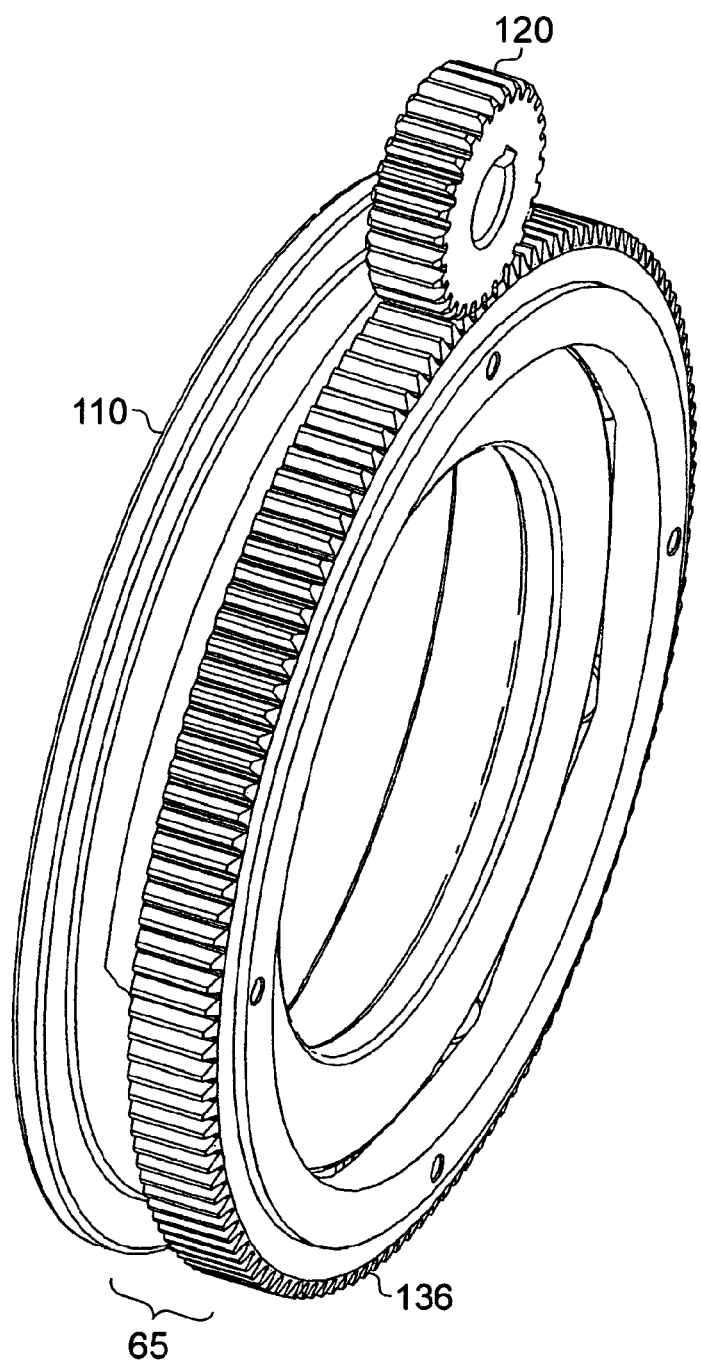
FIGS. 20 to 22 illustrate some components of the transmission ratio clamping force control mechanism.
Figure 21:
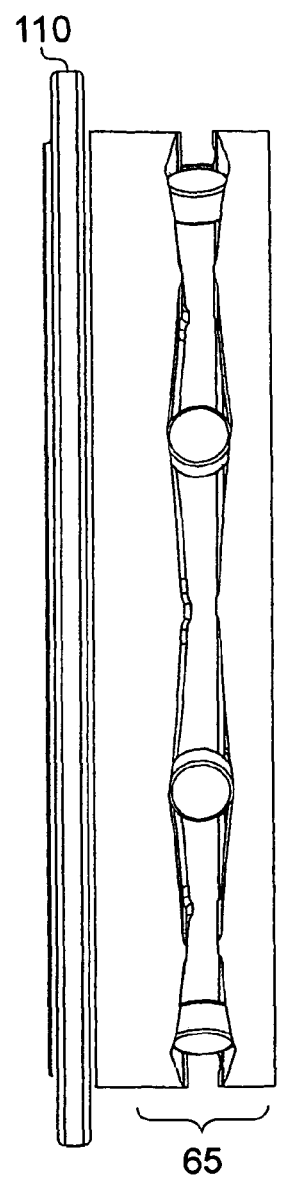
Figure 22:
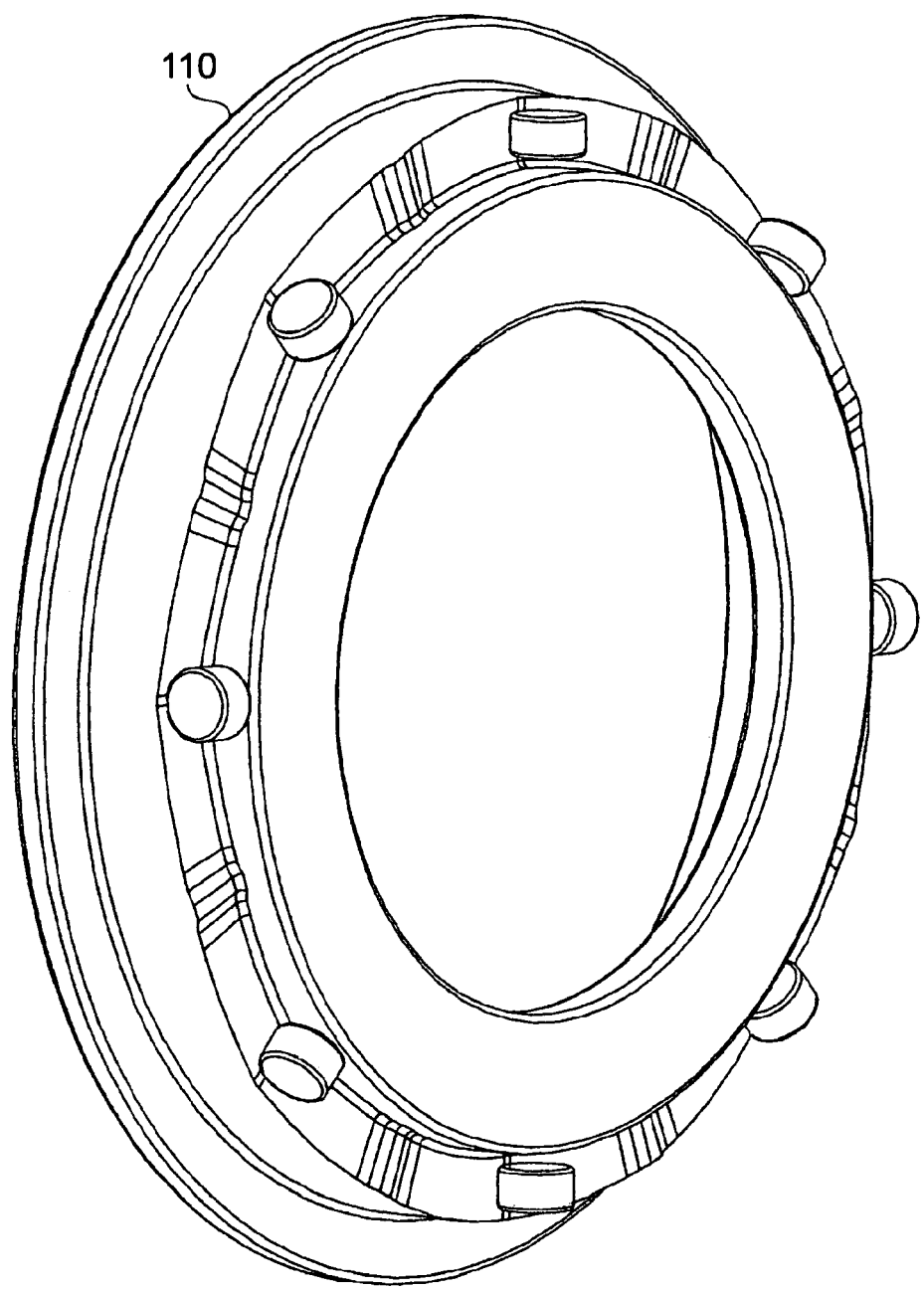

A transmission ratio of the variable transmission device 10 is controlled by a shift gear mechanism shown in FIG. 3. As can be seen, rotating the shift gear shaft 50 causes the gears 120 to engage with the geared shift ramps 130, 140. As shown in FIGS. 20 to 22, the geared shift ramps 130, 140 engage with the transmission ratio clamping control mechanism 65 which causes the outer race parts 100, 110 to move towards or away from each other in the axial direction A. This transmission ratio clamping control mechanism 65 functions in a similar way to the clamping force control mechanism 60 described in more detail below. This urging of the outer race parts 100, 110 towards or away from each other causes the planets 90 to be moved in the radial direction R inwards or outwards. As will be explained in more detail below, the position of the two parts of the inner race 70, 80 shifts in the axial direction A either towards or away from each other in response to the radial movement of the planets 90. In the configuration illustrated in FIG. 2, it can be seen that the radius of rolling contact between the planets 90 and the two parts of the inner race 70, 80 is relatively small and the radius of rolling contact between the planets 90 and the two parts of the outer race 100, 110 is relatively large. In this configuration, therefore, the transmission ratio between the input shaft 30 and the output shaft 40 is at its highest. By rotating the shift gear shaft 50 to cause the two parts of the outer race 100, 110 to move towards each other causes the planets 90 to contact the two parts of the outer race 100, 110 at their radially innermost points, resulting in the planetary member 90 moving radially inwards towards the two parts of the inner race 70, 80, those two parts of the inner race 70, 80 moving axially away from each other, with the planets 90 then contacting the two parts of the inner race 70, 80 at their radially innermost points. In that configuration, the transmission ratio between the input shaft 30 and the output shaft 40 is at its lowest.

The clamping force control mechanism 60 provided between the two inner race parts 70, 80 and the input shaft 30 acts in effect as a torque-sensitive mechanism which varies the amount of force applied between the races and the planets 90, dependent upon the transmission ratio of the device 10.

In overview, rotation of the input shaft 30 in the intended direction of drive causes the two parts of the inner race 70, 80 to approach one another axially when resisted by drag so that any play in the rolling contact between the races and the planets 90 is taken up and compensated by the tendency of two parts of the inner race 70, 80 to approach one another until the forces exerted on the clamping force control mechanism 60 between the two parts of the inner race 70, 80 and the input shaft 30 matches the reaction forces between the two parts of the inner race 70, 80 and the planets 90, at which point no further relative axial displacement of the two parts of the inner race 70, 80 takes place and drive transmission takes place at a transmission ratio determined by the radial position of the planets 90 when this occurs.

Figure 4:
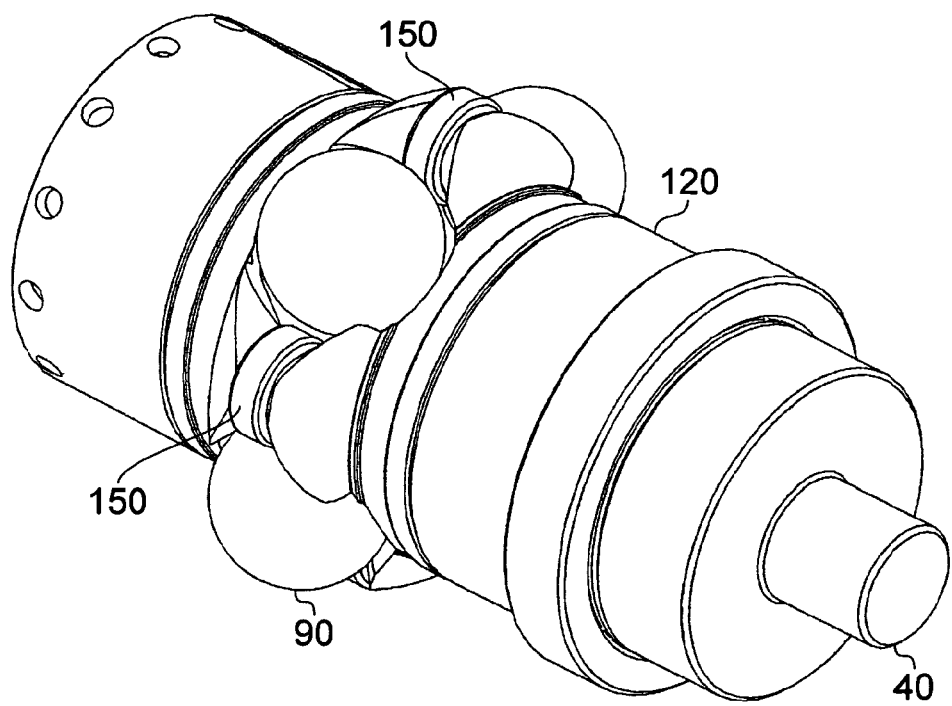
FIG. 4 illustrates in more detail the arrangement of the planets and the planet carrier of the variable transmission device shown in FIG. 1.
Figure 5:
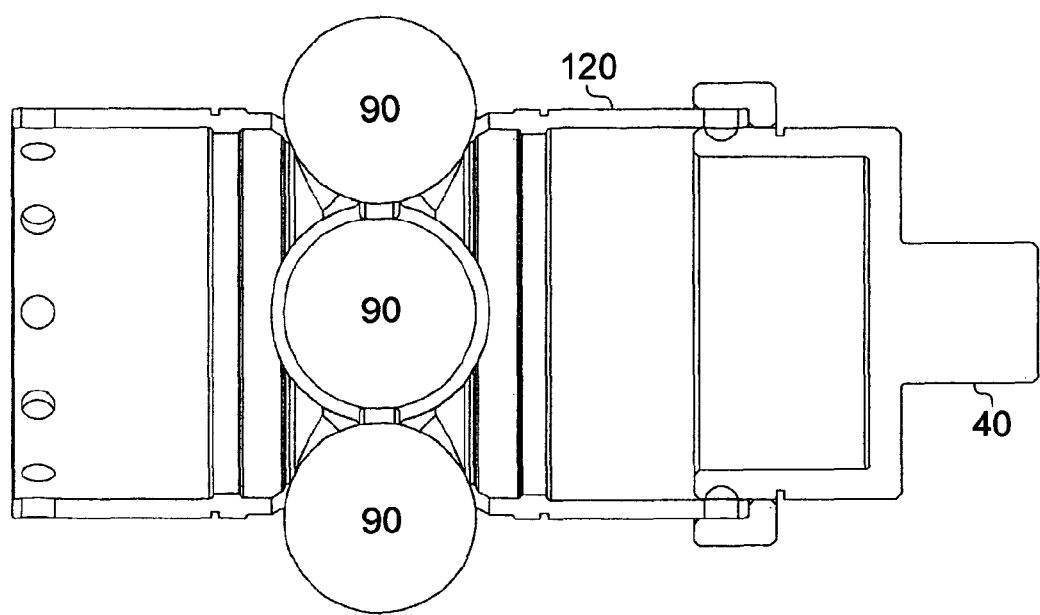
FIG. 5 is a sectional view of FIG. 4.

As mentioned above, the planets 90 engage with a planet carrier 120 to drive the output shaft 40. The arrangement of the planets 90 and their relationship with the planet carrier 120 is shown in more detail in FIGS. 4 and 5. As can be seen, the planet carrier 120 comprises two separable components which receive the planets 90 therebetween and is coupled with the output shaft 40. At the coupling between the two components of the planet carrier 120 is provided a number of needle roller followers 150 which are free to rotate about a pin (not shown) coupling the two components of the planet carrier 120. Rolling traction between the planets 90 and the races causes the planets 90 to rotate and contact with an adjacent needle roller follower 150 which, in turn, causes the planet carrier 120 to rotate and provide a rotational output at the output shaft 40.

Figure 6:
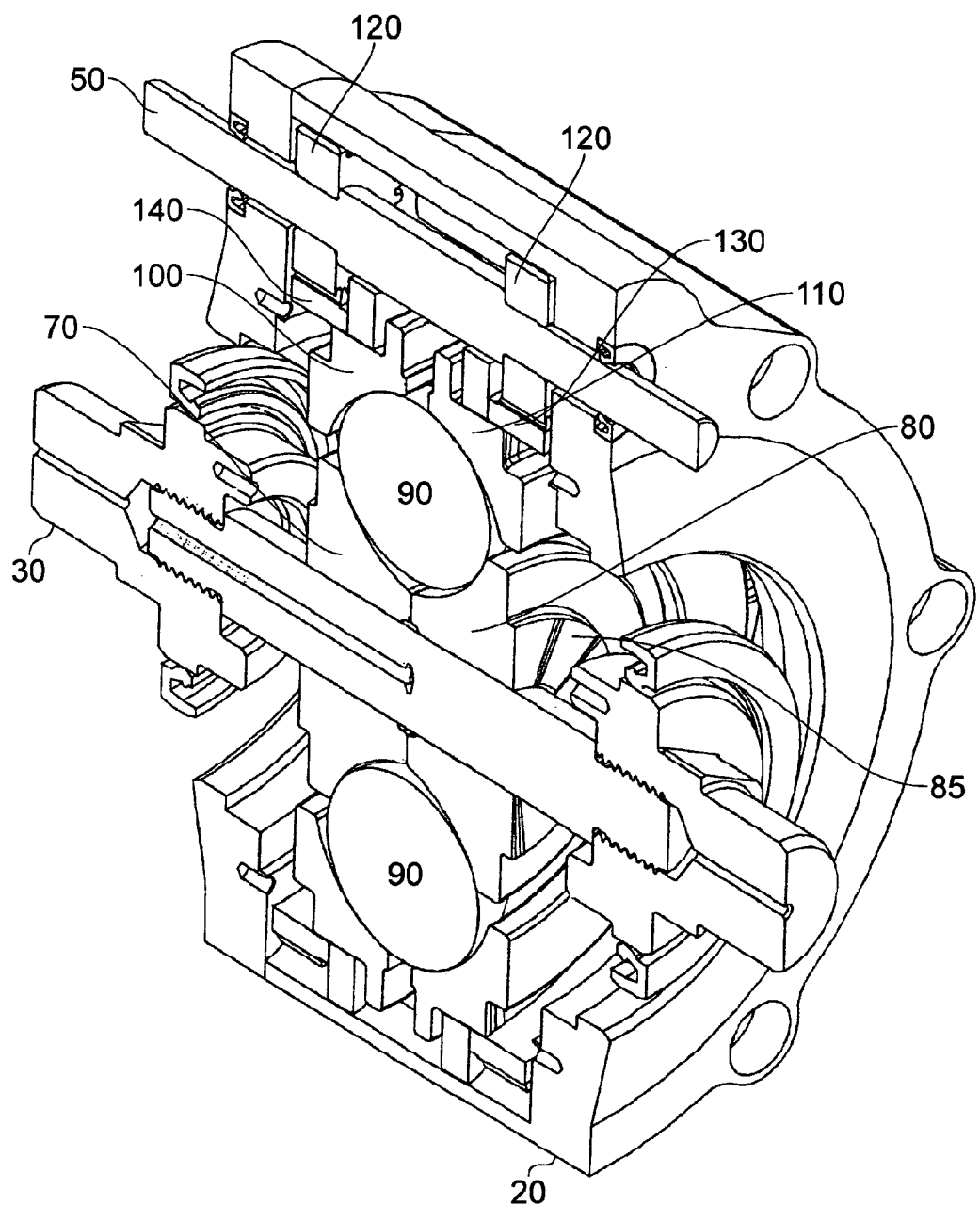
FIG. 6 illustrates a transmission device with the planet carrier and output shaft as well as the main components of the clamping force controller removed.
Figure 7:
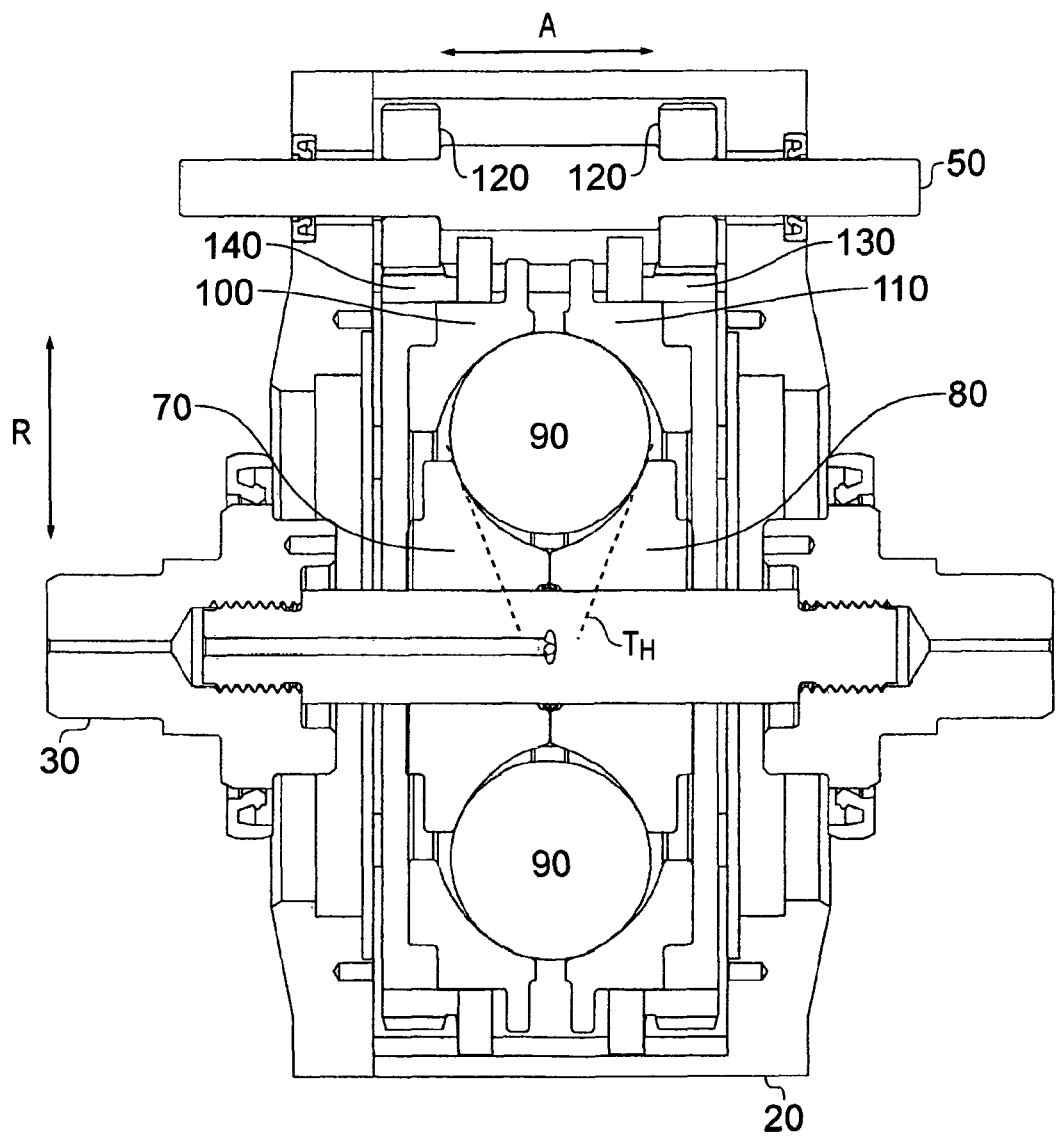
FIG. 7 further illustrates a transmission device with the planet carrier and output shaft as well as the main components of the clamping force controller removed.

FIGS. 6 and 7 show the transmission device 10 with the planet carrier 120 and output shaft 40, as well as the main components of the clamping force controller 60, removed. As can be seen in FIG. 6, the outward face 85 of the part of the inner race 80 has a non-linear ramp provided thereon (as does the outward face of the part of the inner race 70) which, in combination with other components of the clamping force controller 60 provides the necessary clamping force between the two parts of the inner race 70, 80 and the planets 90, as will be described in more detail below.

Figure 8:
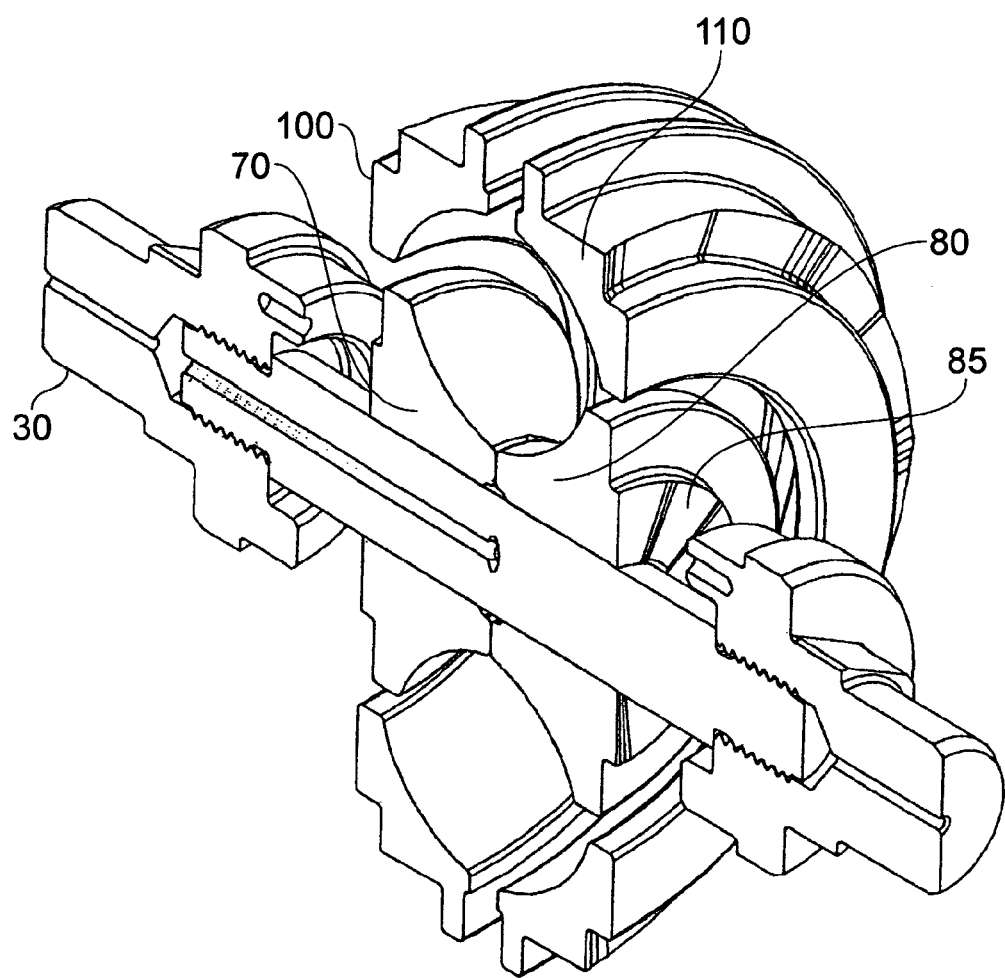
FIG. 8 illustrates in more detail the arrangement the input shaft and the inner and outer races of the variable transmission device shown in FIG. 1.
Figure 9:
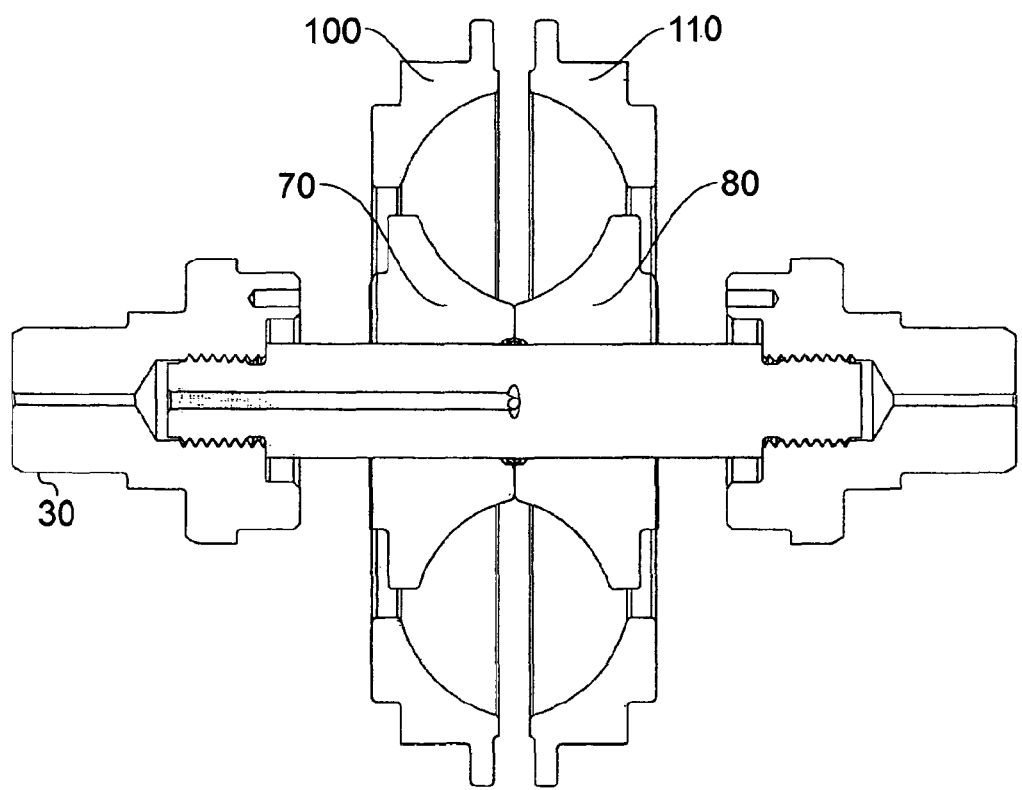
FIG. 9 is a sectional view of FIG. 8.

FIGS. 8 and 9 illustrate in more detail the arrangement the input shaft 30 and the inner and outer races, with all other components removed.

Figure 10:
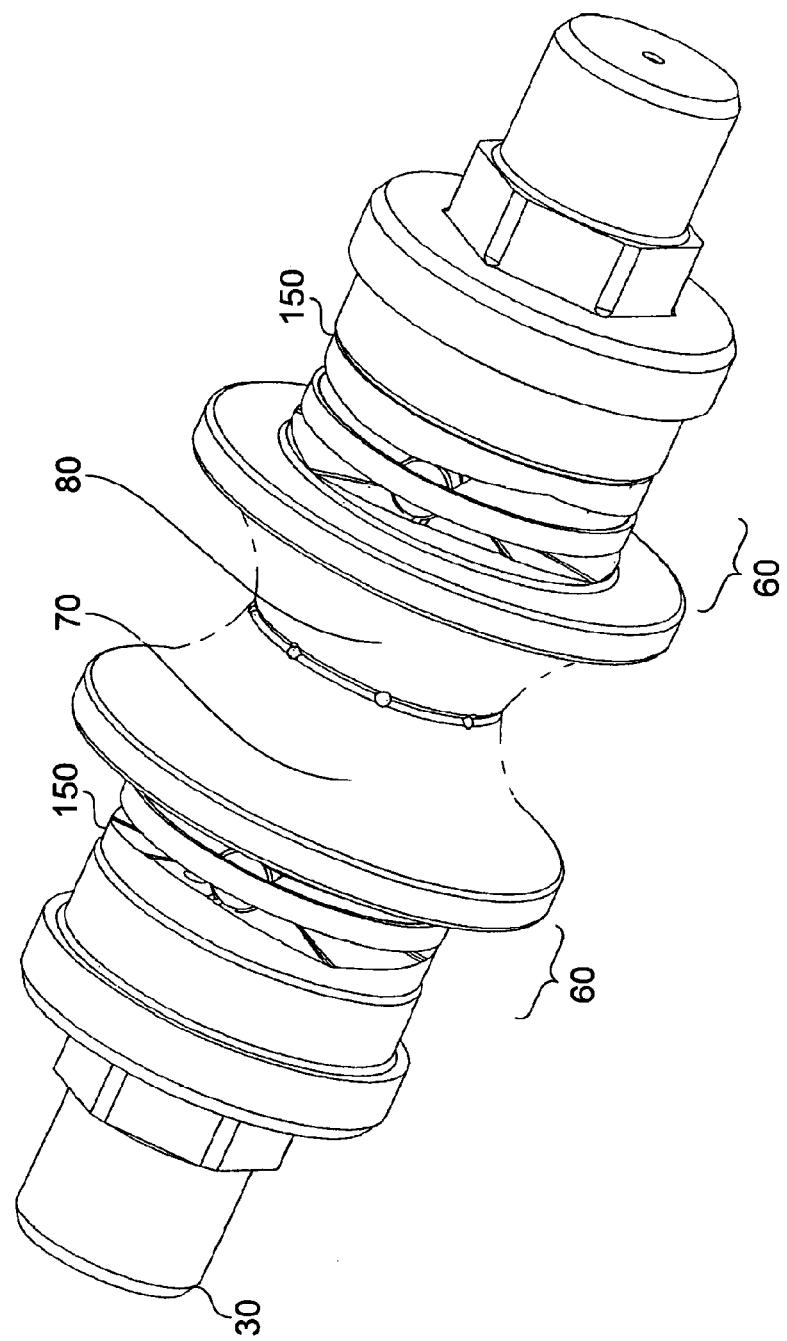
FIG. 10 illustrates in more detail the arrangement of the input shaft, the clamping force controllers and the two parts of the inner race of the variable transmission device shown in FIG. 1.
Figure 11:
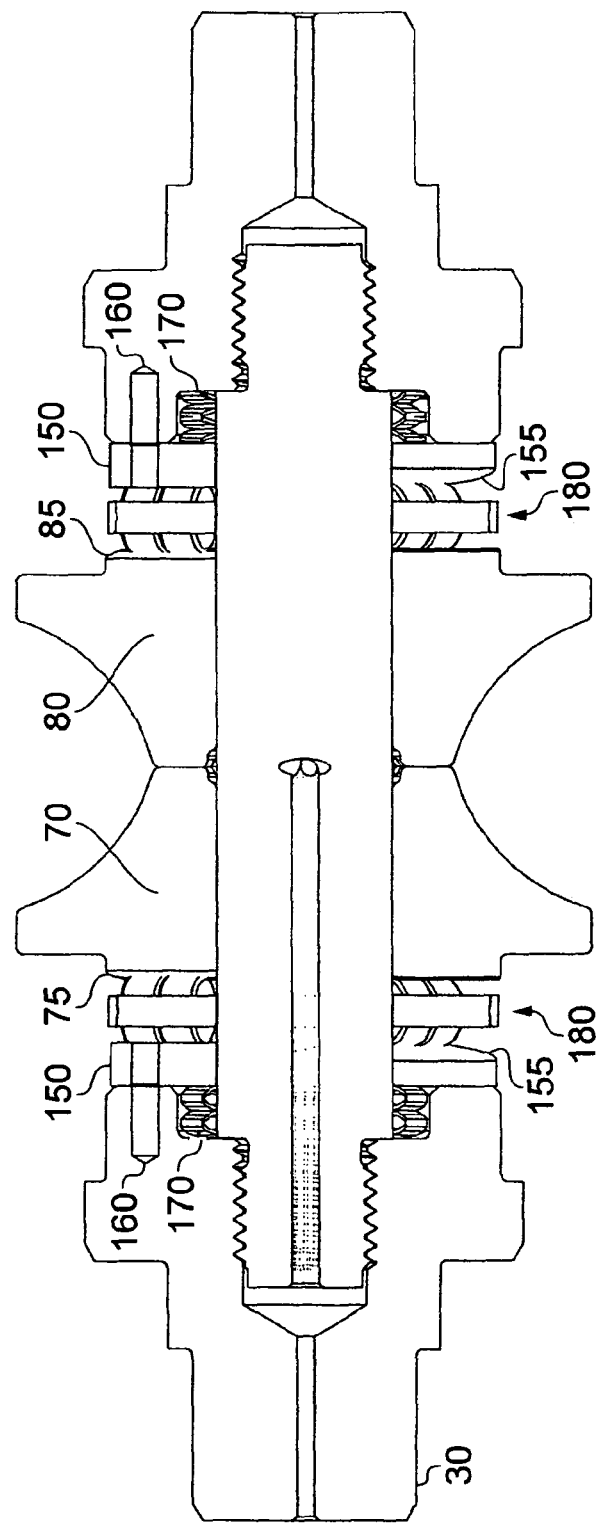
FIG. 11 is a sectional view of FIG. 10.

FIGS. 10 and 11 illustrate the arrangement of the input shaft 30, the clamping force controllers 60 and the two parts of the inner race 70, 80 in more detail. Coupled with the input shaft 30 is an inner ramp 150. The inner ramp 150 has a non-linear profile on the surface 155 which faces towards the two parts of the inner race 70, 80, which will be described in more detail below. The inner ramp 150 engages with the input shaft 30 by way of a series of pins 160, the engagement of the inner ramp 150 with the pins 160 enables the inner ramp 150 to move axially in the direction A when urged to do so under the action of the wave springs 170. The wave springs 170 bias the inner ramps 150 to cause the two parts of the inner race 70, 80 to approach each other. As mentioned above, and shown in FIG. 6, a non-linear ramp profile is also provided on the surfaces 75, 85 of the two parts of the inner race 70, 80 which face towards the inner ramps 150.

Figure 12:
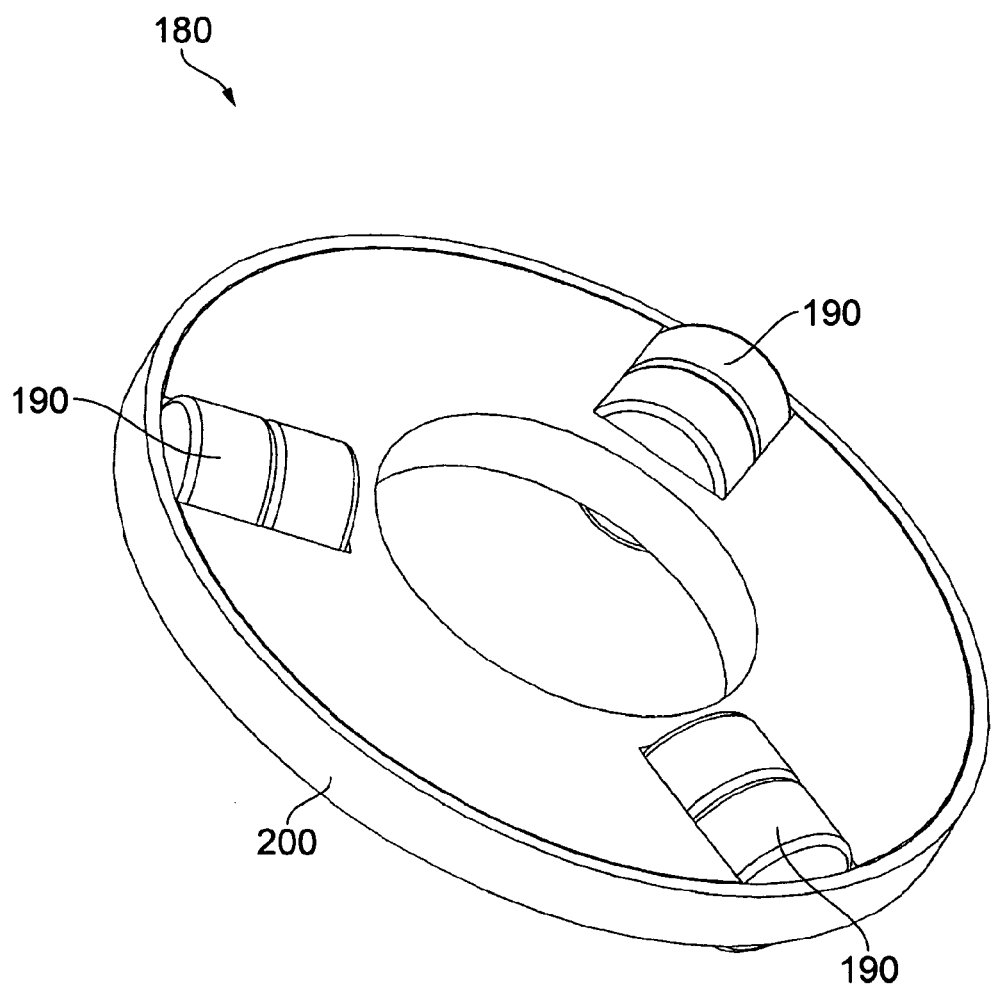
FIG. 12 illustrates in more detail the arrangement of the roller annular disc of the variable transmission device shown in FIG. 1.

Provided between the surface 155 of the inner ramp 150 and the surface 75, 85 of the parts of the inner race 70, 80 is provided a roller annular disc 180 shown in more detail in FIG. 12. The roller annular disc 180 comprises three pairs of rollers 190 spaced radially around the annular disc 180 at 120° intervals, which are received within an annular disc frame 200. Each of the pairs of roller 190 is rotatably mounted within the annular disc frame 200. The roller annular disc 180 operates to reduce friction between the inner ramp 150 and the two parts of the inner race 70, 80 to facilitate their counter rotation. The three pairs of rollers 190 help to spread and distribute the loads experienced between the inner ramp 150 and the two parts of the inner race 70, 80. Hence, it can be seen that the clamping force controllers 60 comprise the surface 155 of the inner ramp 150, the surface 75, 85 of the part of the inner race 70, 80 and the roller annular disc 180.

The number of non-linear profiles duplicated circumferentially around the surface 155 of the inner ramp 150 and the parts of the inner race 70, 80 match the number of pairs of rollers 190. In this case, the non-linear profiles are duplicated three times around the surfaces 75, 85, 155 and three pairs of rollers 190 are provided, each of which travel along one of the non-linear profiles, as will be explained in more detail below. This provides for three points of contact between the parts of the inner race 70, 80 and the inner ramps 150 which helps prevent any twisting occurring as the spacing between the two parts of the inner race 70, 80 changes.

Figure 13:
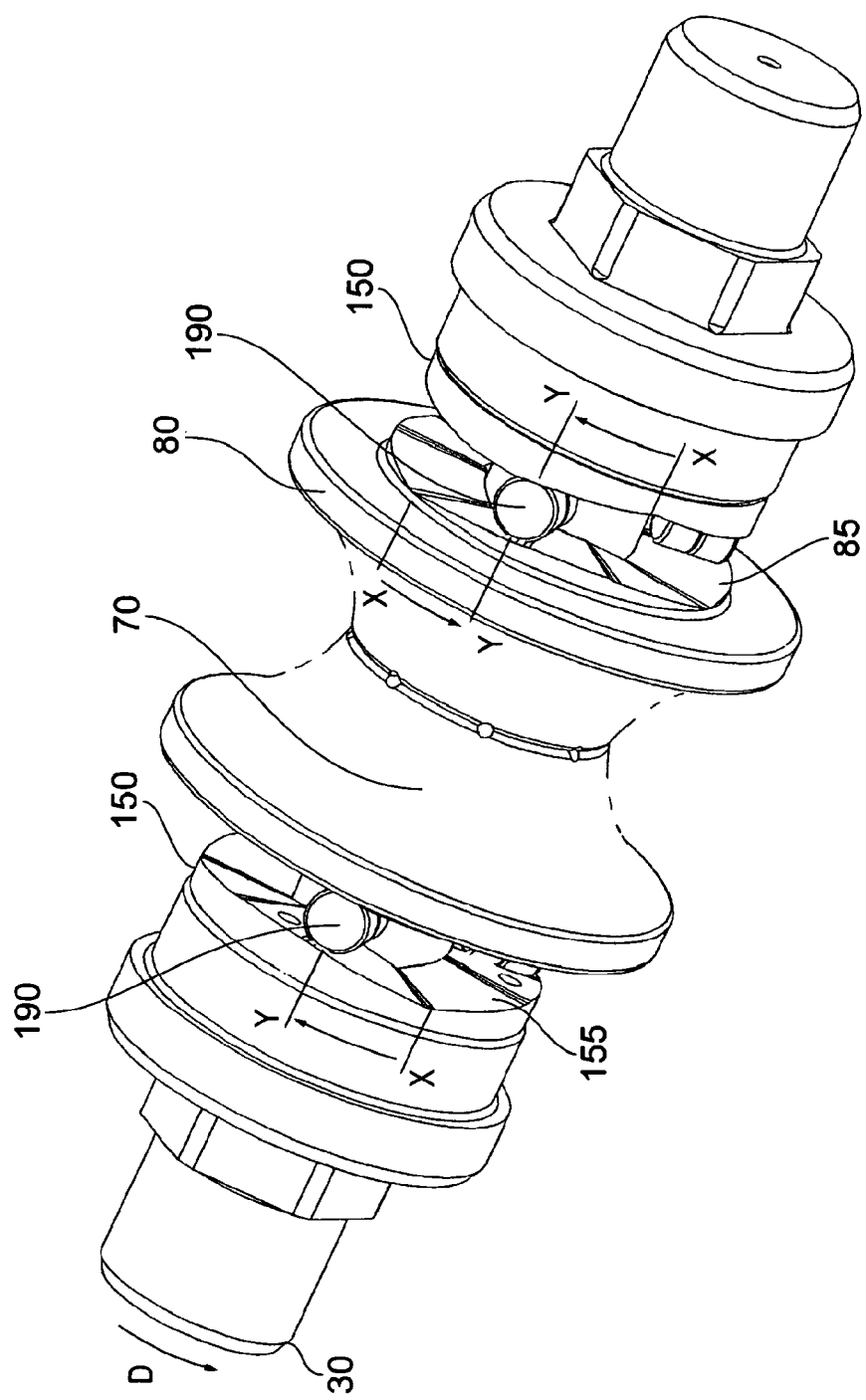
FIG. 13 illustrates in more detail the interaction between the opposing faces of the inner ramp and the two parts of the inner race of the variable transmission device shown in FIG. 1.

FIG. 13 illustrates in more detail the interaction between the surface 155 of the inner ramp 150 and the surface 75, 85 the parts of the inner race 70, 80 when a torque is applied to the input shaft 30 which causes it to rotate in direction D (the annular disc frames 200 have been removed to improve clarity). In the arrangement shown in FIG. 13, the transmission ratio of the device is arranged to be at its highest, meaning that the two parts of the outer race 100, 110 are furthest apart, the planets 90 are at their radially outermost position and the two parts of the inner race 70, 80 are closest together (as shown in FIGS. 6 and 7). At this transmission ratio, the contact angle of the contact patch between the planets 90 and the two parts of the inner race 70, 80 tends more towards to the radial direction R (see the tangent $T_H$ shown in FIG. 7) and so the force that needs to be applied to the two parts of the inner race 70, 80 to achieve a desired contact force between the planets 90 and the two parts of the inner race 70, 80 needs to be high because very little mechanical advantage is achieved with such a steep contact angle.

Accordingly, as shown in FIGS. 13 to 16, application of the torque in the direction D to the input shaft 30 causes a counter rotation between the inner ramps 150 and the parts of the inner race 70, 80 from a starting or resting position X to the clamping position Y. As can be seen, the pairs of rollers 190 roll along the surface 155 of the inner ramps 150 and the surface 75, 85 of parts of the inner race 70, 80 until they reach the position Y. At the position Y, the distance between the inner ramps 150 and parts of the inner race 70, 80 are at their greatest, meaning that the parts of the inner race 70, 80 are at their closest approach. Also, the slope $S_Y$ (see FIG. 16) of the surface 75, 85 of the parts of the inner race 70, 80 and the surface 155 of the inner ramps 150 at the position Y are at their smallest, which provides a large mechanical advantage leading to a high multiplying effect and therefore reduces the amount of force that would otherwise need to be exerted by the inner ramps 150 in order to provide a high clamping force between the two parts of the inner race 70, 80 and the planets 90 in that position.

Conversely, when the shift gear shaft 50 is arranged such that the two parts of the outer race 100, 110 are at their closest approach, which causes the planets 90 to be at their radially innermost position, the two parts of the inner race 70, 80 will be at a position in which they are furthest apart. In that position, the transmission ratio of the device is at its lowest. At this transmission ratio, the contact angle of the contact patch between the planets 90 and the two parts of the inner race 70, 80 tends more towards to the axial direction A and so the force that needs to be applied to the two parts of the inner race 70, 80 to achieve a desired contact force between the planets 90 and the two parts of the inner race 70, 80 needs to be low because a high mechanical advantage is achieved with such a shallow contact angle.

Accordingly, application of the torque in the direction D to the input shaft 30 causes a counter rotation between the inner ramps 150 and the parts of the inner race 70, 80 from a starting or resting position X to the clamping position close to the starting or resting position X. The pairs of rollers 190 roll along the surface 155 of the inner ramps 150 and the surface 75, 85 of parts of the inner race 70, 80 until they reach this position. At this position, the distance between the inner ramps 150 and parts of the inner race 70, 80 are at their least, meaning that the parts of the inner race 70, 80 are at their furthest apart. Also, the slope of the surface 75, 85 of the parts of the inner race 70, 80 and the surface 155 of the inner ramps 150 at close to the starting or resting position X are at their greatest, which provides a small mechanical advantage leading to a low multiplying effect and therefore increases the amount of force that would otherwise need to be exerted by the inner ramps 150 in order to provide a low clamping force between the two parts of the inner race 70, 80 and the planets 90 in that position.

Hence, it can be seen that the non-linear profile of the surface 75, 85 of the parts of the inner race 70, 80 and the surface 155 of the inner ramps 150 the changes the clamping force applied at different ratios. Accordingly, the clamping force applied is a function both of the torque applied to the input shaft 30 and the different multiplier effects of the clamping force controllers 60 at the different ratios. In other words, the non-linear profiles give a different fixed force multiplier for each different ratio, and the clamping force then varies dependent on the input torque proportionately to that force multiplier.

The non-linear profile is derived based on the particular geometry of the planets 90 and the parts of the inner race 70, 80 and the parts of the outer race 100, 110, dependent on the coefficient of friction between these. In general, the non-linear profile is defined generally in accordance with the following algorithm:

$$\text{Lead} = \frac{\mu * R_{contact} * \pi}{\sin(\theta)}$$

where $\mu$ is the coefficient of friction between the parts the races 70, 80, 100, 110 and the planets 90, R is the contact radius and $\theta$ is the contact angle.

More specifically, the coefficient of traction $\mu$ is the ratio of tangential force to normal force that can be sustained at a particular contact area without excessive slip. This value is a function of many different variables like material, fluid, geometry, etc.

The design coefficient of traction $\mu\_design$ is the tangential force to normal force that the variable transmission drive generates by design. The tangential force is usually some function of the torque being transmitted. The normal force is often controlled by means the clamping force controller.

It would therefore be beneficial to closely match the design coefficient of traction μ_design with the coefficient of traction μ.

Figure 23:
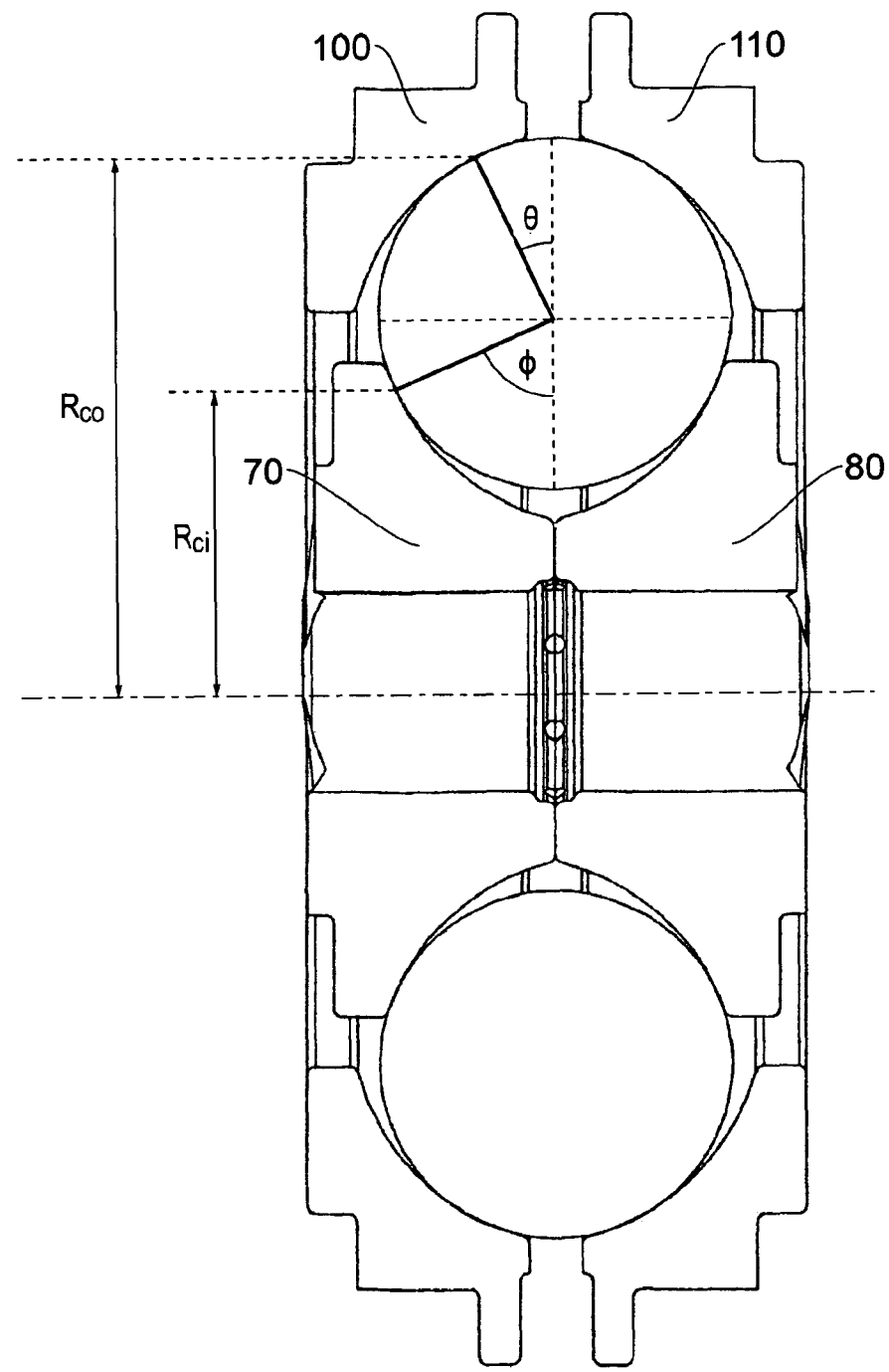
FIG. 23 illustrates the geometrical notation used to determine ramp leads.

In a planetary continuously variable transmission, the normal force is a function of the lead, and torque applied, as well as the inclination angle of the load with the contact patch, with the tangential force being a function of the torque and operating radius of the contact patch. Thus the design coefficient of friction μ_design is a function of lead (Lead), torque (T), angle (θ), and radius (R). It is therefore possible to solve for lead as a function of μ_design, T, θ, and R. This produces a lead that is non-linear and capable of providing the ideal clamping load for a CVT across its transmission ratio range. In practice the torque variables cancel out and the equations for lead of the inner and outer ramps become:

$$Lead_{in} = \frac{\mu_{design} * R_{contact,in} * \pi}{\sin(\varphi)}$$

$$Lead_{out} = \frac{\mu_{design} * R_{contact,out} * \pi}{\sin(\theta)}$$

as illustrated in more detail in FIG. 23.

Figure 14:
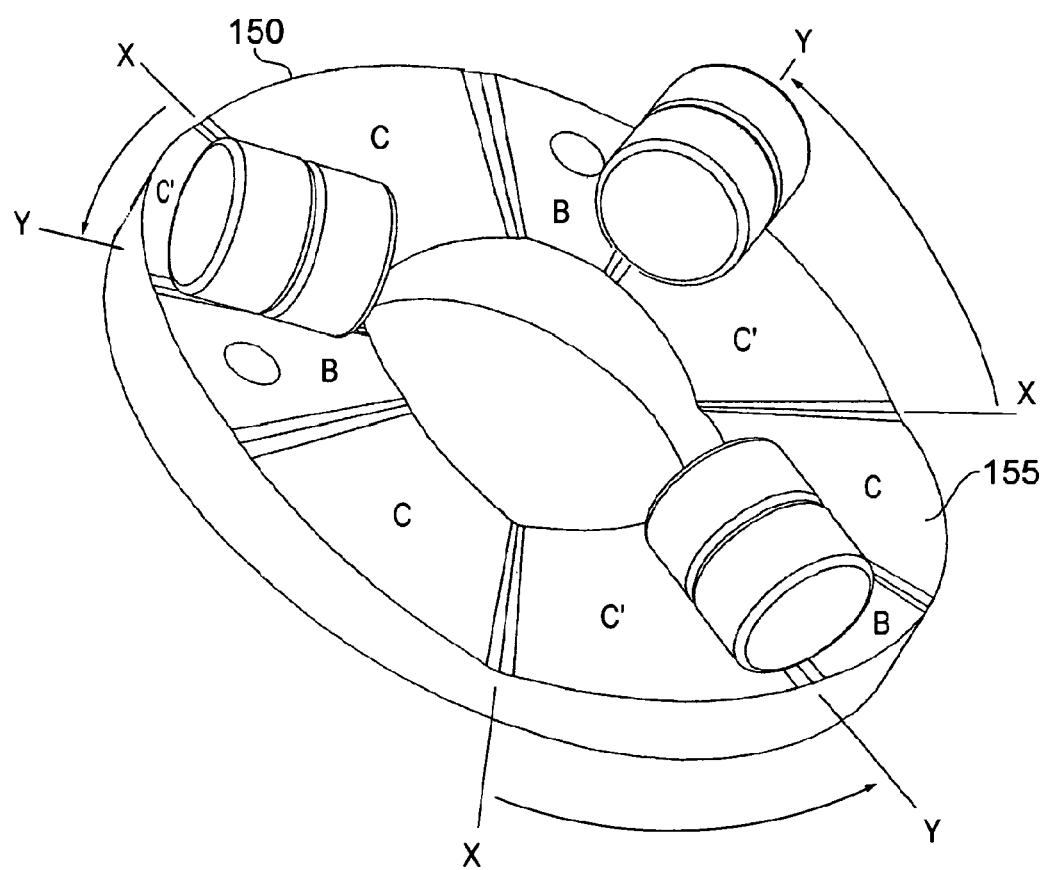
FIG. 14 illustrates in more detail the non-linear surface of the inner ramps of the variable transmission device shown in FIG. 1.
Figure 15:
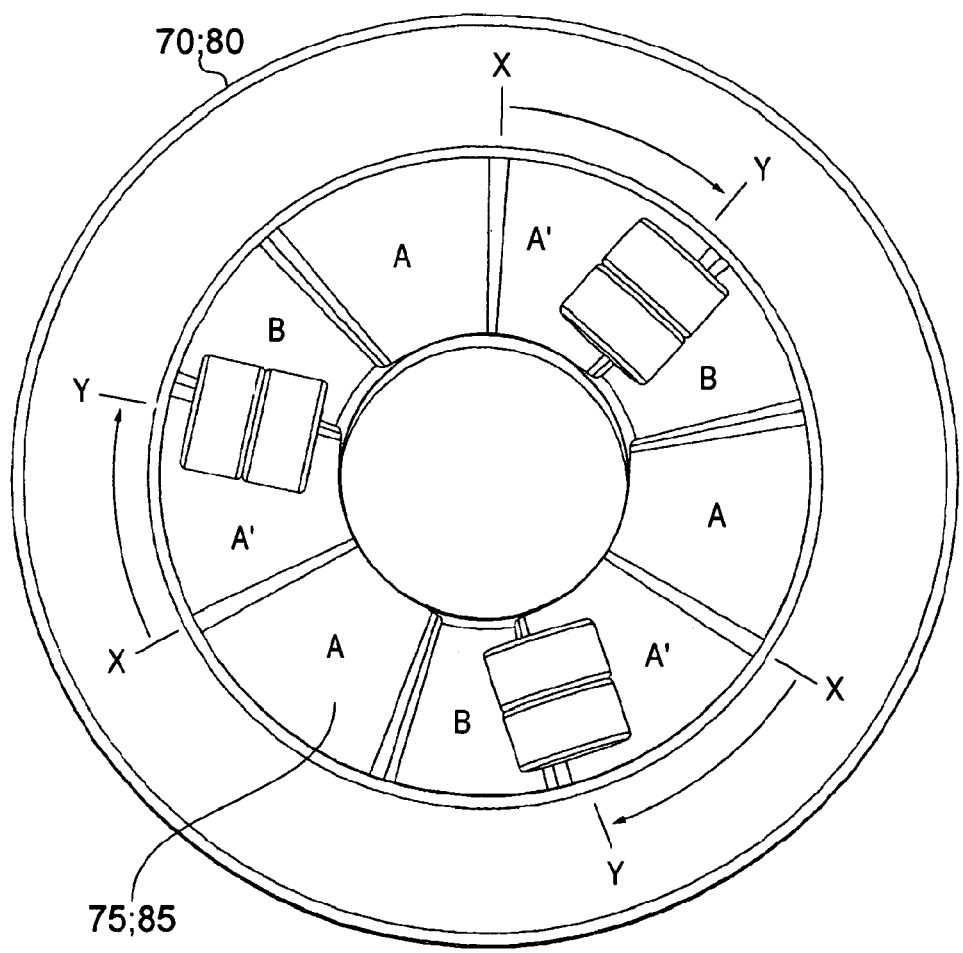
FIG. 15 illustrates in more detail the non-linear surface of the parts of the inner race of the variable transmission device shown in FIG. 1.
Figure 16:
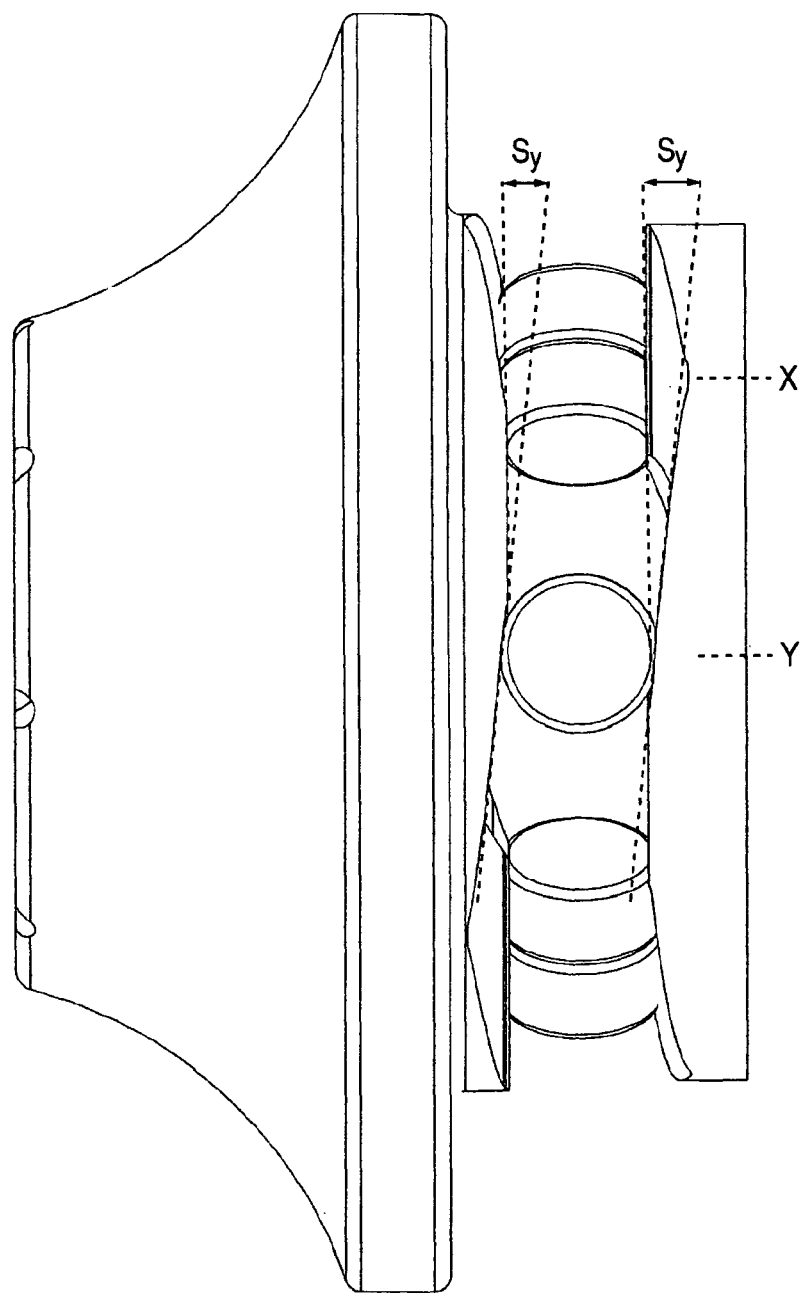
FIG. 16 illustrates in more detail the interaction between the non-linear surfaces of the parts of the inner race and the inner ramps of the variable transmission device shown in FIG. 1.

As can be seen in FIGS. 14 and 15, the non-linear profile of the slope is mirrored from the starting position X circumferentially in either direction. For example, on the inner ramp 150, starting from position X, a profile surface C is provided in one direction and a mirrored profile surface C' is provided in the other direction. Likewise, on the parts of the inner race 70, 80, a profile surface A is provided when moving circumferentially from the starting position X and a mirrored profile surface A' when moving in the other direction. Providing these mirrored surfaces enables appropriate torque generation to occur when operating the variable transmission device 10 in both forward and reverse directions.

As can be seen from FIGS. 14 and 15, an intermediate area B is provided which provides a null area between the mirrored slope regions and helps to prevent the pairs of roller 190 from travelling too far and becoming trapped in an adjacent region.

Figure 17:
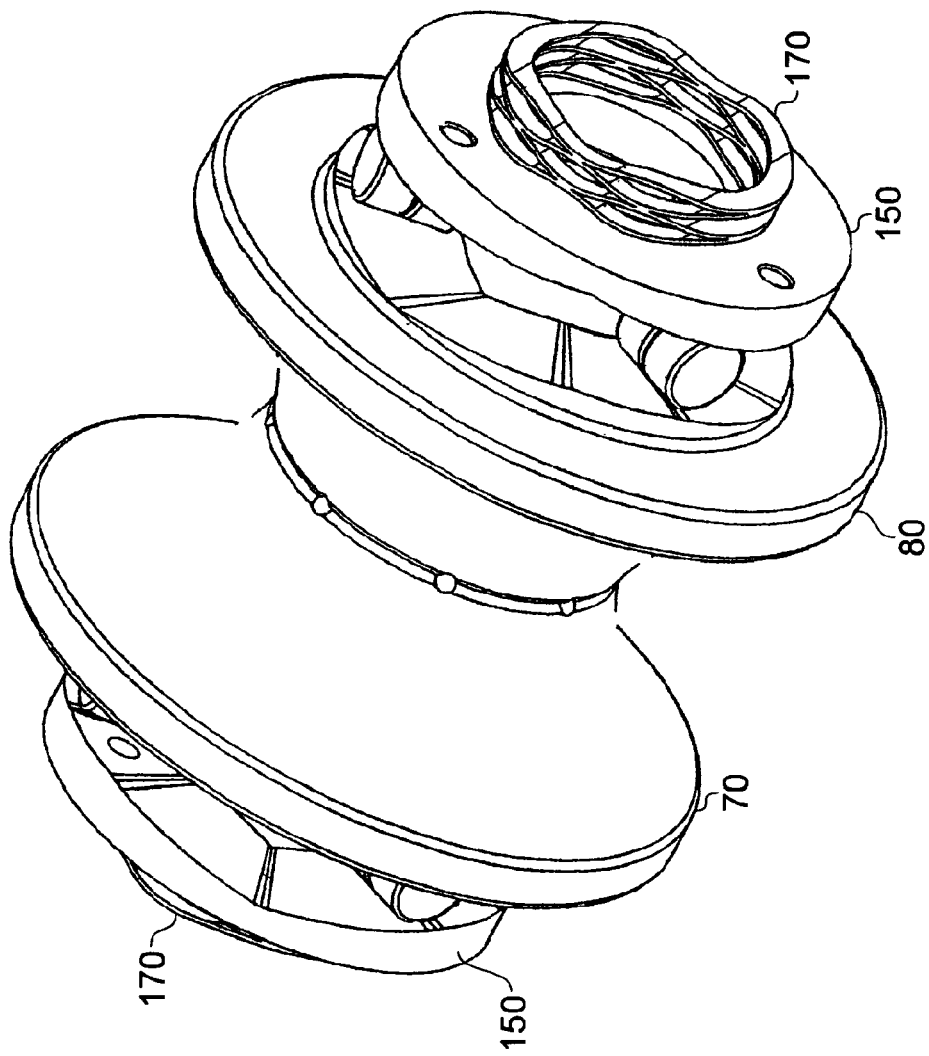
FIG. 17 illustrates in more detail the interaction between the opposing faces of the inner ramps and the two parts of the inner race of the variable transmission device shown in FIG. 1.
Figure 18:
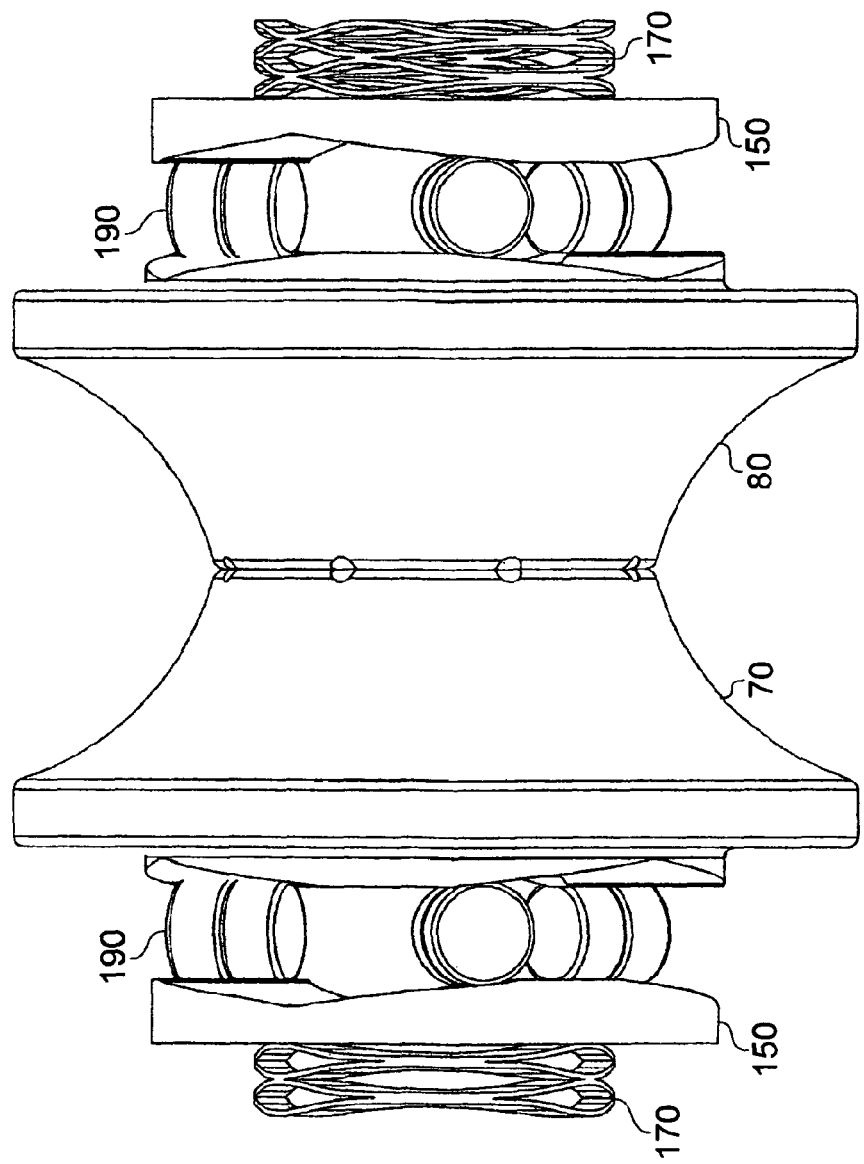
FIG. 18 is a side view of FIG. 17.
Figure 19:
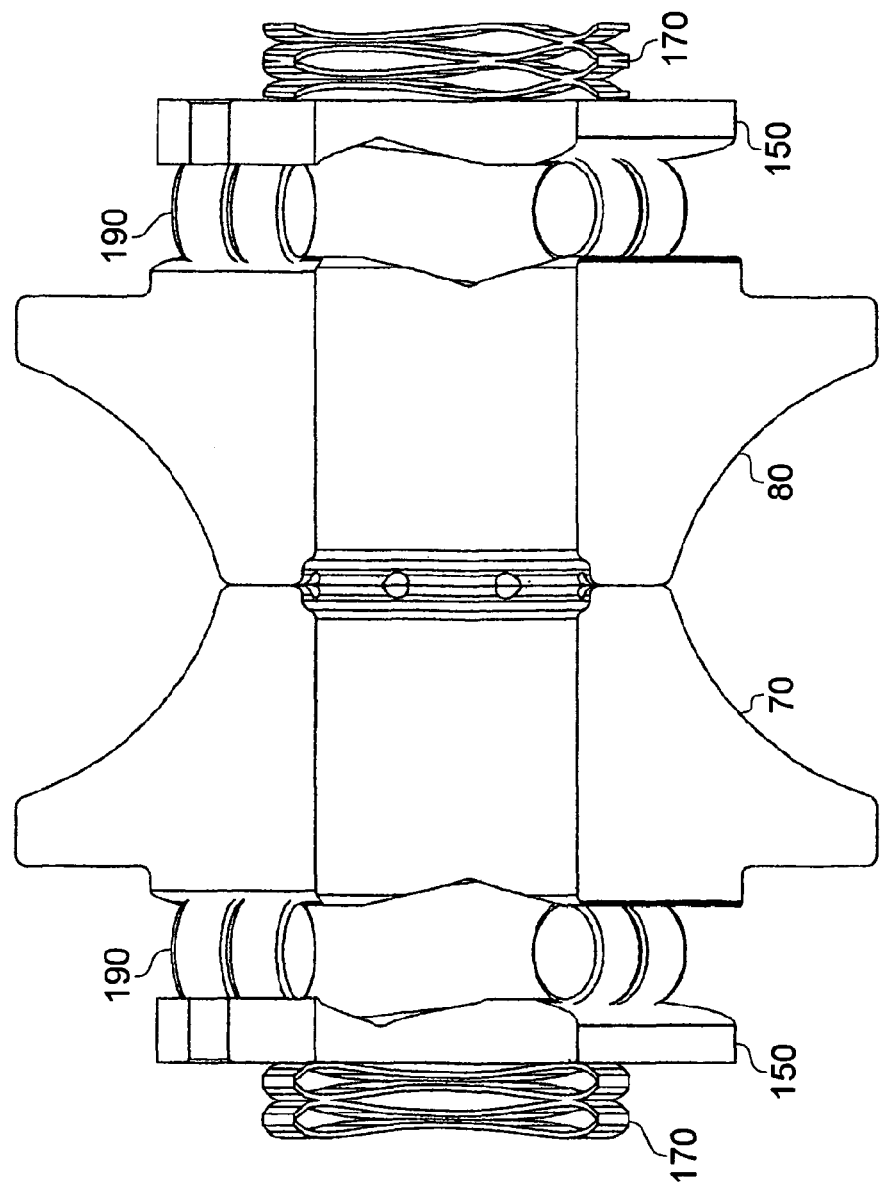
FIG. 19 is a sectional view of FIG. 18.

FIGS. 17 to 19 illustrate components of the clamping force controller in more detail. As can be seen, the wave springs 170 provide a preload to the two parts of the inner race 70, 80 which helps urge the two parts of the inner race 70, 80 together. The use of the wave springs 170 both assists in ensuring that the parts of the inner and outer race 70, 80, 100, 110 remain continuously in contact with the planets 90, as well as helping to facilitate changes in the transmission ratio. The wave springs 170 particularly facilitate a change in transmission ratio when the device is static by enabling the two parts of the inner race 70, 80 to move apart as the transmission ratio between the input shaft and the output shaft is lowered by moving the two parts of the outer race 100, 110 together, thereby causing a radially inward movement of the planets 90.

Hence, it can be seen that providing a non-linear ramp enables the clamping force generated between the parts of the races 70, 80, 100, 100 and the planets 90 to be varied dependent on the transmission ratio of the variable transmission device 10. Accordingly, rather than simply generating a clamping force which is proportionate to the torque applied to the input shaft 30, the clamping force generated is proportionate to both the input torque and the transmission ratio of the variable transmission device 10. In this way, only the required amount of clamping force is generated, which is suited to the particular transmission ratio of the variable transmission device 10. This helps to ensure that the loading on the components is reduced, the amount of friction and heat generated within the device is minimised which reduces wear and the efficiency of the variable transmission device 10 is increased.

Accordingly, embodiments provide a continuously variable transmission that requires relative axial displacement of one or more elements as a means of ratio change having a variable lead ramp to cause the axial displacement as a function of relative rotation. The lead of ramp is a function of relative rotation and provides a controlled clamp force as a function of both torque and displacement.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

What is claimed:

1. A variable transmission device comprising:
radially inner and outer races, each comprising two parts spaced along an axis;
planetary members arranged in rolling contact with said inner and outer races;
a transmission ratio controller operable to vary a separation along said axis of said two parts of one of said inner and outer races resulting in a radial displacement of said planetary members to vary a transmission ratio; and
a clamping force controller coupled to at least one of said two parts of another of said inner and outer races and to an input shaft, said clamping force controller comprising opposing surfaces operable rotate relative to each other in response to a torque applied to said input shaft, at least one of said opposing surfaces being defined by a ramp having a non-linear lead profile, said relative rotation of said opposing surfaces causing a non-linear change in separation along said axis of said two parts of said another of said inner and outer races to accommodate said radial displacement of said planetary members and to control clamping forces applied between said planetary members and said inner and outer races proportionately to said torque applied to said input shaft and said different transmission ratios.

2. The variable transmission device of claim 1, wherein said non-linear lead profile of said ramp provides, for each transmission ratio, a different predetermined clamping force for a predetermined torque applied to said input shaft.

3. The variable transmission device of claim 1, wherein said non-linear lead profile of said ramp provides a clamping force which is higher for said predetermined torque applied to said input shaft when a tangent to a contact patch between said planetary members and said another of said inner and outer races tends towards being normal to said axis than a clamping force for said predetermined torque applied to said input shaft when said tangent to said contact patch between said planetary members and said another of said inner and outer races tends towards being parallel with said axis.

4. The variable transmission device of claim 3, wherein said non-linear lead profile of said ramp has a slope which is shallower when said tangent to said contact patch between said planetary members and said another of said inner and outer races tends towards being normal to said axis than when said tangent to said contact patch between said planetary members and said another of said inner and outer races tends towards being parallel with said axis.

5. The variable transmission device of claim 1, wherein said non-linear lead profile is mirrored to enable said clamping forces to be generated in response to said torque applied to said input shaft when both rotated and counter-rotated.

6. The variable transmission device of claim 1, wherein both of said opposing surfaces are defined by ramps having a non-linear lead profile.

7. The variable transmission device of claim 1, wherein said non-linear lead profile is defined in accordance with the following algorithm:

$$\text{Lead} = \frac{\mu * R_{contact} * \pi}{\text{Sin}(\theta)}$$

where $\mu$ is the coefficient of friction between the races and planets, R is the contact radius and $\theta$ is the contact angle.

8. The variable transmission device of claim 1, wherein said clamping force controller comprises a pair of annular rings coaxially aligned to provide said opposing surfaces, a first of said pair of annular rings being coupled to said input shaft and a second of said pair of annular rings being coupled to at least one of said two axially spaced parts of said another of said inner and outer races.

9. The variable transmission device of claim 8, wherein said clamping force controller comprises two pairs of annular rings, each pair being coaxially aligned to provide respective opposing surfaces, a first of each pair of annular rings being coupled to said input shaft and a second of each pair of annular rings being coupled to a respective one of said two axially spaced parts of said another of said inner and outer races.

10. The variable transmission device of claim 1, wherein said clamping force controller comprises:
a friction-reducing device disposed between said opposing surfaces and operable to reduce friction caused by relative rotation of said opposing surfaces.

11. The variable transmission device of claim 1, wherein said clamping force controller comprises:
a pre-clamping device operable to apply a pre-clamping force between said planetary members and said inner and outer races.

12. The variable transmission device of claim 11, wherein said pre-clamping device comprises a spring arrangement operable to bias said two axially spaced parts of another of said inner and outer races towards each other.

13. The variable transmission device of claim 1, comprising a transmission ratio force controller comprising the clamping force controller coupled to at least one of said two parts of said one of said inner and outer races and to a transmission ratio control shaft.

14. A method of defining a profile of a ramp of a clamping force controller of a variable transmission device comprising: radially inner and outer races, each comprising two parts spaced along an axis; planetary members arranged in rolling contact with said inner and outer races; a transmission ratio controller operable to vary a separation along said axis of said two parts of one of said inner and outer races resulting in a radial displacement of said planetary members to vary a transmission ratio; and said clamping force controller coupled to at least one of said two parts of another of said inner and outer races and to an input shaft, said clamping force controller comprising opposing surfaces operable to rotate relative to each other in response to a torque applied to said input shaft, at least one of said opposing surfaces being defined by a ramp, said relative rotation of said opposing surfaces causing a non-linear change in separation along said axis of said two parts of said another of said inner and outer races to accommodate said radial displacement of said planetary members and to control clamping forces applied between said planetary members and said inner and outer races proportionately to said torque applied to said input shaft and said different transmission ratios, said method comprising the steps of:
defining said ramp to have a non-linear lead profile.

15. The method of claim 14, wherein said step of defining comprises:
defining said ramp to have said non-linear lead profile to provide, for each transmission ratio, a different predetermined clamping force for a predetermined torque applied to said input shaft.

16. The method of claim 14, wherein said step of defining comprises:
defining said ramp to have said non-linear lead profile to provide a clamping force which is higher for said predetermined torque applied to said input shaft when a tangent to a contact patch between said planetary members and said another of said inner and outer races tends towards being normal to said axis than a clamping force for said predetermined torque applied to said input shaft when said tangent to said contact patch between said planetary members and said another of said inner and outer races tends towards being parallel with said axis.

17. The method of claim 14, wherein said step of defining comprises:
defining said ramp to have said non-linear lead profile to provide a slope which is shallower when said tangent to said contact patch between said planetary members and said another of said inner and outer races tends towards being normal to said axis than when said tangent to said contact patch between said planetary members and said another of said inner and outer races tends towards being parallel with said axis.

18. The method of claim 14, comprising the step of:
mirroring said non-linear lead profile to enable said clamping forces to be generated in response to said torque applied to said input shaft when both rotated and counter-rotated.

19. The method of claim 14, comprising the step of:
defining ramps of both of said opposing surfaces to have a non-linear lead profile.

20. The method of claim 14, wherein said clamping force controller comprises at least a pair of annular rings coaxially aligned to provide said opposing surfaces, a first of said pair of annular rings being coupled to said input shaft and a second of said pair of annular rings being coupled to at least one of said two axially spaced parts of said another of said inner and outer races, said method comprising the step of:
repeating said non-linear lead profile a predetermined number of times around each annular ring.

* * * * *